US006177780B1

(12) United States Patent
Roy et al.

(10) Patent No.: US 6,177,780 B1
(45) Date of Patent: Jan. 23, 2001

(54) BATTERY CHARGER WITH IMPROVED RELIABILITY

(75) Inventors: James Roy, Dewinton; Don Lafont, Calgary, both of (CA)

(73) Assignee: Veritas DGC, Inc., Houston, TX (US)

( * ) Notice: Under 35 U.S.C. 154(b), the term of this patent shall be extended for 0 days.

(21) Appl. No.: 09/208,137

(22) Filed: Dec. 9, 1998

(51) Int. Cl.[7] ........................................ H02J 7/00
(52) U.S. Cl. ............................... 320/128; 320/134
(58) Field of Search ............................. 320/107, 119, 320/128, 134

(56) References Cited

U.S. PATENT DOCUMENTS

| 4,918,368 | 4/1990 | Baker et al. | 320/40 |
|---|---|---|---|
| 5,013,992 | 5/1991 | Eavenson et al. | 320/31 |
| 5,157,320 | 10/1992 | Kuriloff | 320/39 |
| 5,198,743 | 3/1993 | McClure et al. | 320/31 |
| 5,319,298 | 6/1994 | Wanzong et al. | 320/22 |
| 5,422,558 | 6/1995 | Stewart | 320/7 |
| 5,459,671 | 10/1995 | Duley | 364/483 |
| 5,565,756 | 10/1996 | Urbish et al. | 320/15 |
| 5,594,318 | * 1/1997 | Nor et al. | 320/108 |
| 5,666,040 | 9/1997 | Bourbeau | 320/6 |
| 5,670,863 | 9/1997 | Broell et al. | 320/22 |
| 5,703,464 | 12/1997 | Karunasiri et al. | 320/19 |
| 5,708,348 | 1/1998 | Frey et al. | 320/21 |
| 5,710,503 | 1/1998 | Sideris et al. | 320/6 |
| 5,710,506 | 1/1998 | Broell et al. | 320/522 |

OTHER PUBLICATIONS

Lead–Acid Fast–Charge IC, Benchmarq, bq2031, dated Apr. 1997.

* cited by examiner

Primary Examiner—Peter S. Wong
Assistant Examiner—Gregory J Toatley, Jr.
(74) Attorney, Agent, or Firm—Conley, Rose & Tayon, P.C.; Jonathan M. Harris

(57) ABSTRACT

A battery charger system providing increased reliability over conventional chargers includes one or more charging modules coupled to a central controller module. Each charging module is cable of charging one or two batteries and includes control logic that controls the charging current provided to each battery. Each charging module is capable of charging the associated batteries using a pre-programmed, selectable charging protocol. The control logic included in each of the charging module provides a "first level of intelligence" for charging batteries. The controller module provides a "second level of intelligence" that generally operates in conjunction with the first level of intelligence provided by the charging modules. The second level of intelligence provided by the controller module individually enables and disables charging to a particular battery by an associated charging module. The charging modules are capable of charging batteries even without control from the second level of intelligence. Thus, reliability is increased by being able to continue battery charging even if the controller module fails or is removed from the battery charging system. Other features such as the lack of battery voltage sense lines removes the possibility of failure due to faulty or damaged sense lines, thereby increasing reliability.

9 Claims, 35 Drawing Sheets

BATTERY CHARGER WITH IMPROVED RELIABILITY

BACKGROUND OF THE INVENTION

1. Field of the Invention

The present invention generally relates to a battery charger. More particularly, the invention relates to a modular battery charger system with charging control distributed among various modules. Still more particularly, the invention relates to a modular charger system with improved reliability and employing an improved method for determining a fully charged battery.

2. Background of the Invention

Although rechargeable batteries and battery rechargers have been available for years, significant room for improvement remains in this technology. Some rechargeable batteries are used in non-benign, outdoor environments. For example, land-based seismic survey equipment typically employs rechargeable batteries to power the data acquisition units used to acquire seismic data. These batteries, like all rechargeable batteries, must be recharged periodically. Normally, the batteries are removed from the equipment and connected to rechargers which are transported to the site being seismically surveyed. For some surveys it may be preferable to leave the recharging equipment in the field rather than transporting it to the field each time the batteries need charging.

As such, the rechargers are operated in an outdoor environment which often is harsh to the electronics comprising the recharger. The environment may include conditions such as high humidity, high or low temperature, rain, snow, or sleet. Such environmental conditions increase the likelihood of a failure in the charger. Field-based battery chargers typically are constructed to minimize the risk of the internal components becoming ruined from moisture and also to reduce damage to the unit occasioned by falling tree limbs, mishandling by field personnel and other factors. Although being able to easily maintain the recharger is important, conventional chargers are constructed more for durability than maintainability. That is, servicing such chargers usually is difficult to perform in the field. Thus, when a conventional charger fails, a technician is sent into the field to examine and, if possible, repair the unit. Often, however, the technician is forced to return the unit to a well-equipped, indoor service facility to make the repair, a procedure which is time consuming and costly.

Some field-based battery chargers are capable of charging more than one battery at a time. Such chargers usually have multiple charging circuits, each circuit capable of charging a single battery. Typically, if just one of the charging circuits in such a charger fails, the entire charger, including the remaining fully functional charging circuits, may have to be transported to a service facility to repair or replace the one malfunctioning circuit. Thus, because of one malfunctioning charging circuit, the entire charging capability of the charger is lost until the repair is completed. Accordingly, it would be desirable have a battery charger that, is highly reliable, and also can be repaired without losing the full charging capability of the unit while the failure is being corrected.

The desire for increased reliability also applies to battery chargers that are used indoors in a more benign environment where the possibility of a malfunction still exists. In many indoor applications, battery chargers may be used in time critical events such as related to the use of medical equipment in a hospital in which battery and battery charger "down time" should be minimized.

Another aspect of reliable battery charging involves determining when a battery has been fully charged. Determining the "end of charge" condition prevents a battery from being over-charged, a condition that can damage certain types of rechargeable batteries. Many conventional end of charge determinations are based on measuring the voltage of the battery and determining when the voltage meets or exceeds a predetermined threshold. Often, such voltage-based end of charge protocols are inaccurate because of a particular battery's chemistry. Such inaccuracies may cause a battery to be under-charged (i.e., not be fully charged) or be over-charged to a certain extent. Thus, a more accurate, reliable method for determining the end of charge condition is needed.

Accordingly, it would be desirable to have a battery charger that provides greater reliability and maintainability than with conventional chargers and can more precisely charge a battery to full capacity. Despite the advantages that such a charger would offer, to date no such charger has been introduced.

BRIEF SUMMARY OF THE INVENTION

The deficiencies of the prior art described above are solved in large part by a battery charger system that provides increased reliability over conventional chargers. The charging system includes one or more charging modules coupled to a central controller module. Each charging module operates independently of, and is unaffected by, other charging modules. In this manner, reliability of the overall charging system is increased because a failure of one charging module does not affect the charging capability of other charging modules.

Electrical power for charging the batteries and driving the electronics internal to the charging and controller modules preferably is provided by a 24 VDC power supply. Each charging module is cable of charging one or more batteries and includes control logic that separately controls the charging current provided to each battery. Each charging module is capable of charging the associated batteries using a pre-programmed, selectable charging protocol. The control logic included in any each charging module provides a "first level of intelligence" for charging batteries. The first level of intelligence generally selects various stages of charging and discontinues charging when the battery is fully charged.

The controller module provides a "second level of intelligence" that generally operates in conjunction with the first level of intelligence provided by the discrete charging modules. The second level of intelligence provided by the controller module enables and disables charging to an individual battery by asserting an inhibit signal to the charging module associated with the targeted battery. Disabling battery charging may be desired as a result of detecting a fully charged battery or detecting fault conditions such as over voltage, over current, out of range temperature, or leakage current. Disabling battery charging also may be desired as a result of detecting faulty batteries by monitoring rate of voltage, current and temperature changes within the charging battery. The charging modules advantageously are capable of charging batteries even without control from the second level of intelligence. Thus, reliability also is increased by being able to continue battery charging even if the controller module fails or is removed from the battery charging system.

Other factors contribute to the increased reliability of the preferred battery charging system. For example, the present battery charging system does not require a pair of sense lines connecting the battery terminals to the charging module as is typical for conventional battery chargers. Sense lines of conventional chargers permit those chargers to determine the actual voltage of the battery without the voltage drop associated with battery cables. The charging modules of the preferred embodiment include a resistor which develops a voltage indicative of the current through the battery and that voltage is used by the control logic in each charger module to compensate for battery cable voltage drop during charging.

The various characteristics described above, as well as other features, will be readily apparent to those skilled in the art upon reading the following disclosure.

BRIEF DESCRIPTION OF THE DRAWINGS

A complete understanding of the present invention can be obtained when the following detailed description of the preferred embodiments is considered in conjunction with the following drawings, in which:

FIGS. 3A-1 through 3A-9 and FIGS. 3B-1 through 3B-6 are schematic diagrams of the controller module of FIG. 1.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1A:
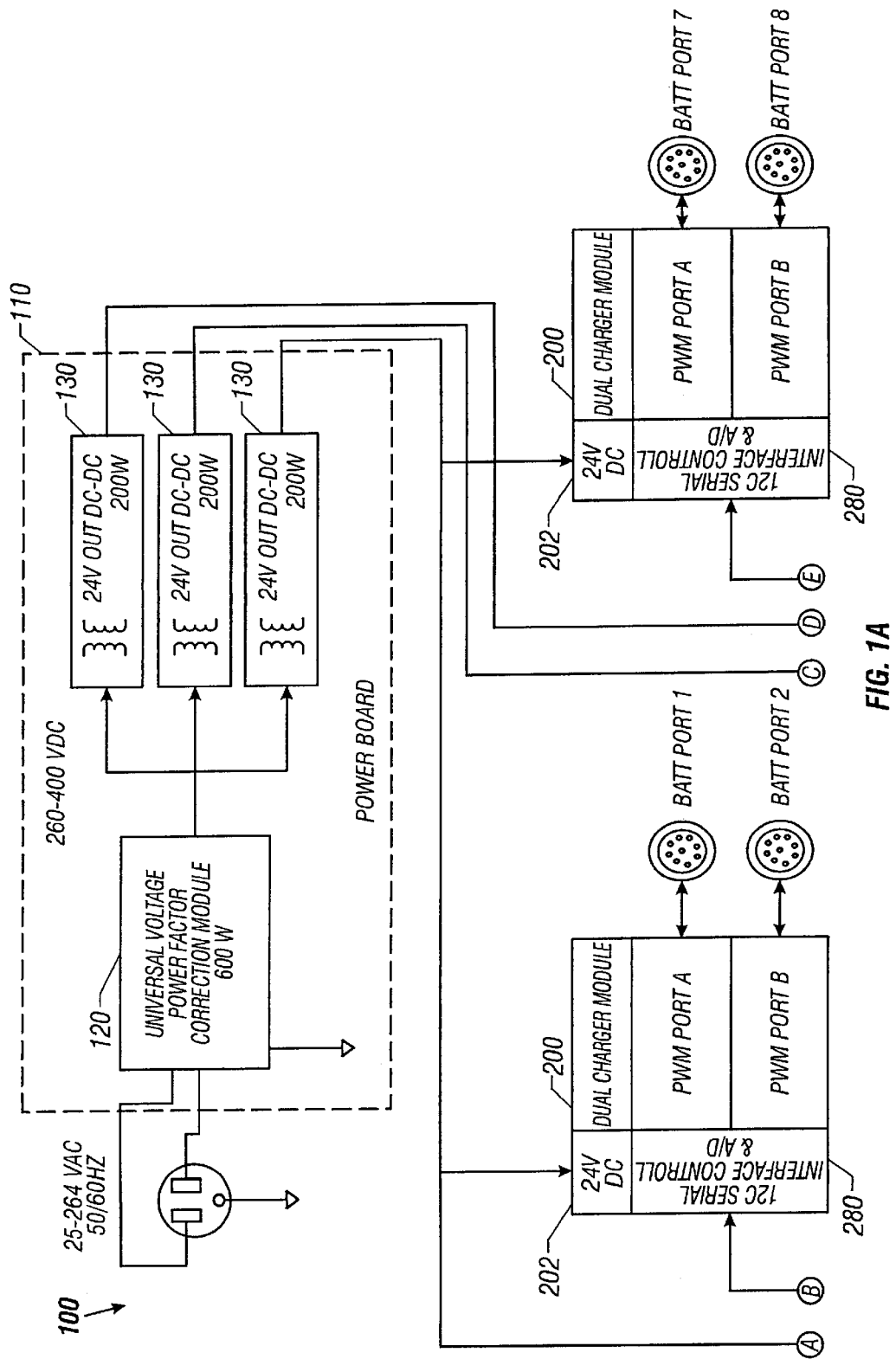
FIGS. 1A through 1C show a block diagram of a battery charger system constructed in accordance with the preferred embodiment of the invention and including a power supply, one or more charger modules and a controller module.
Figure 1B:
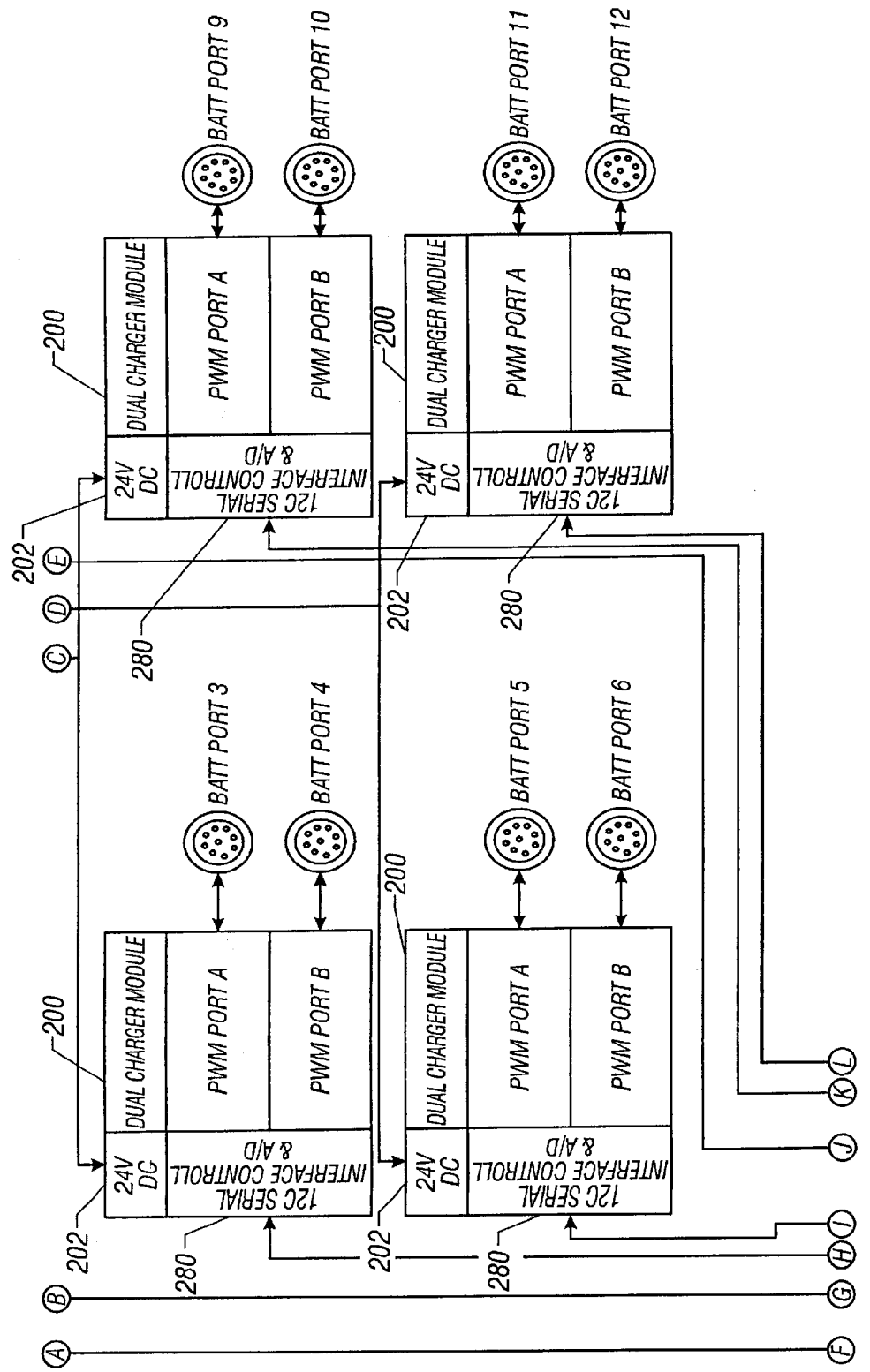
Figure 1C:
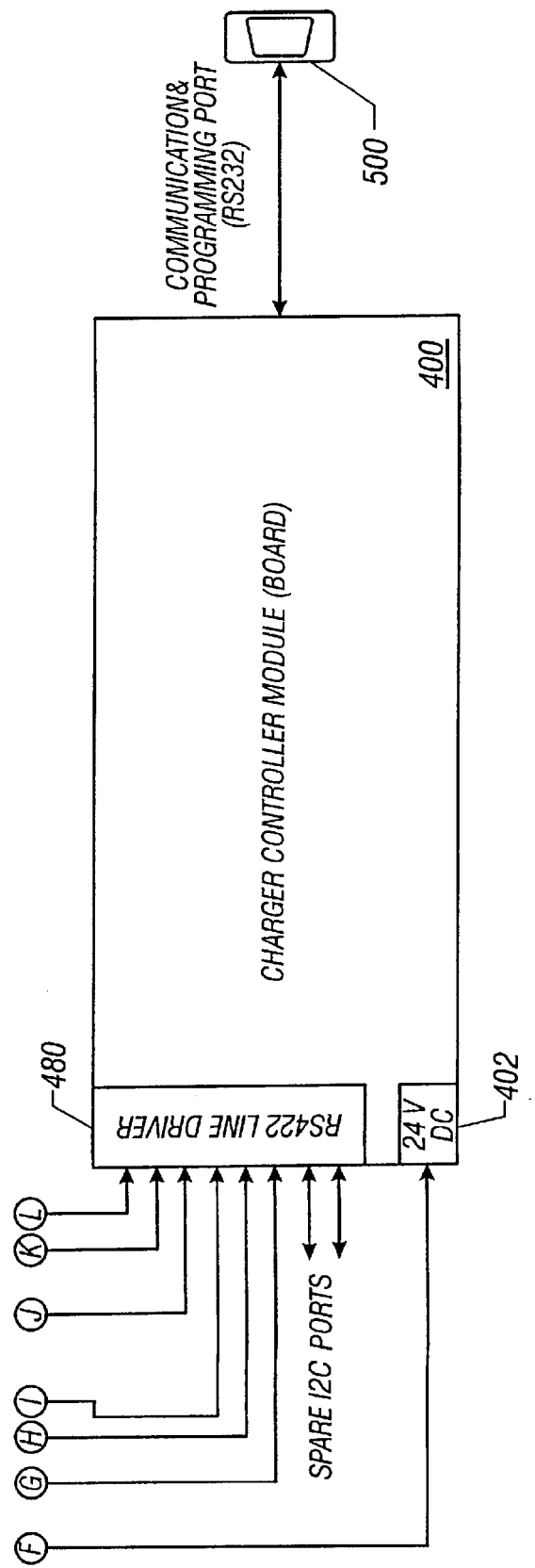
Figures 1, 2A:
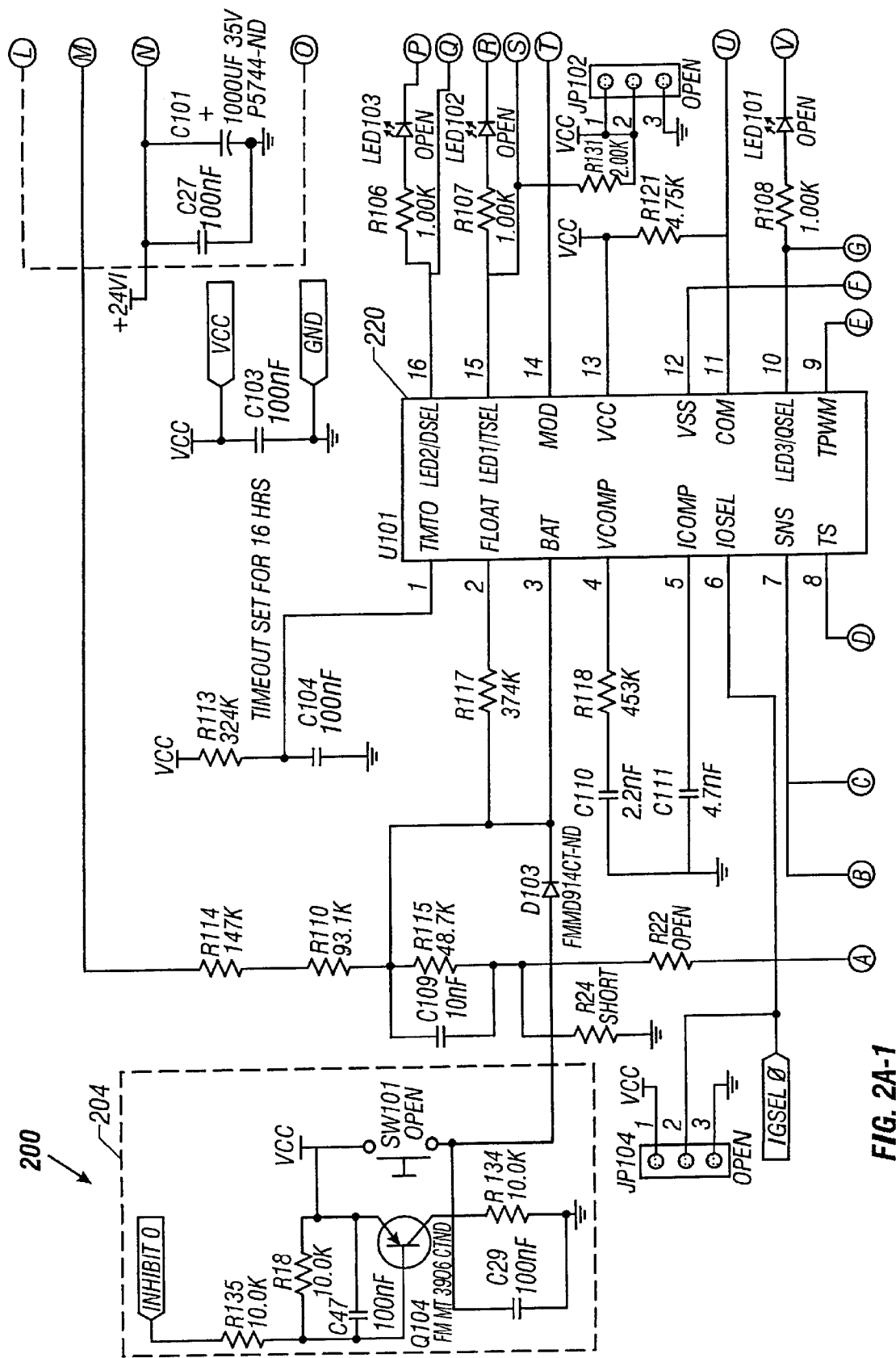
FIGS. 2A-1 through 2A-4, FIGS. 2B-1 through 2B-4, and FIGS. 2C-1 through 2C-9 are schematic diagrams of the charger modules of FIG. 1.
Figures 2, 2A:
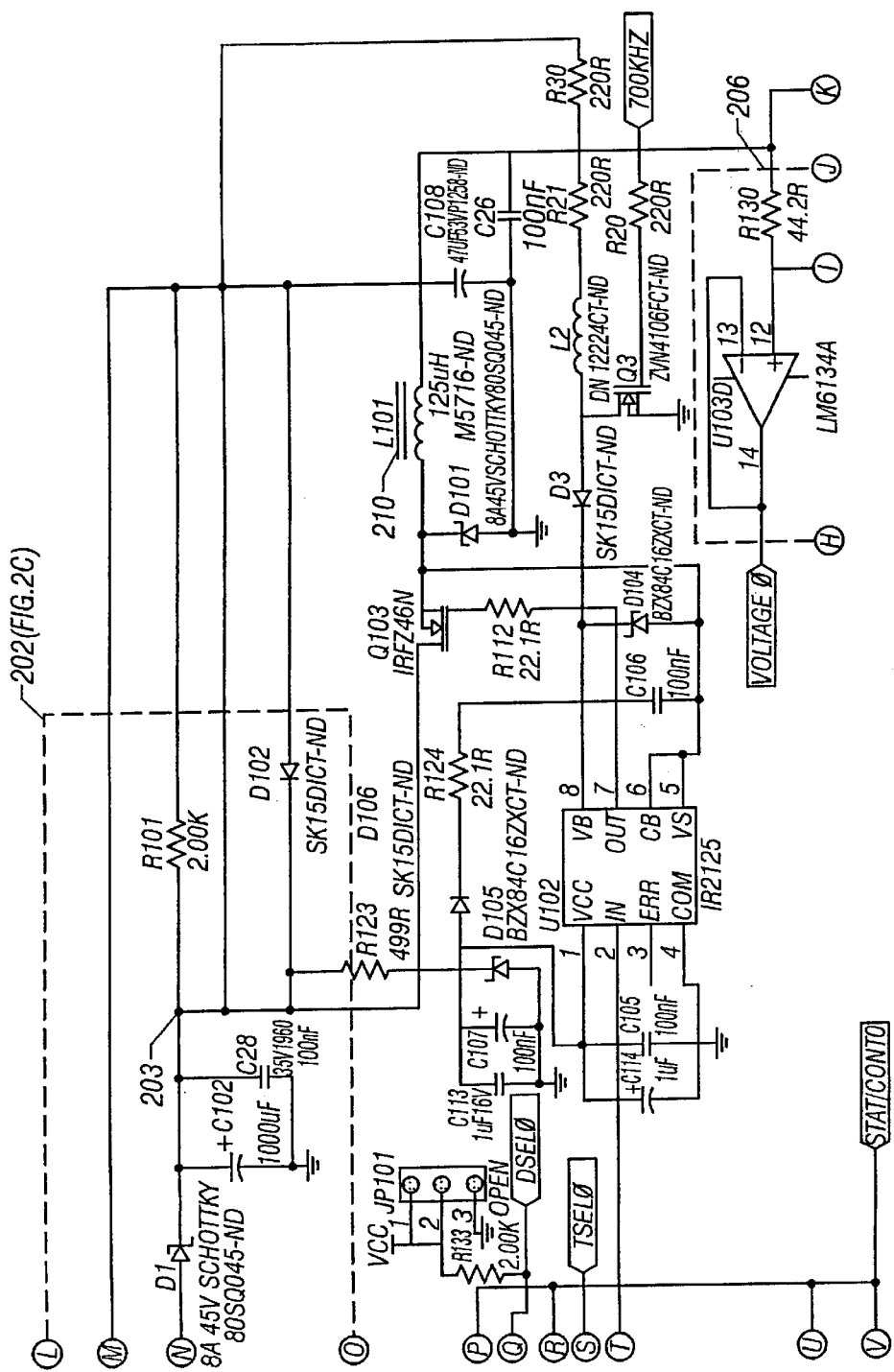

Referring now to FIG. 1, which is comprised of three subfigures entitled FIGS. 1A, 1B and 1C, a battery charger system 100 constructed in accordance with the preferred embodiment generally includes a power supply unit 110 (FIG. 1A), one or more charger modules 200 (FIGS. 1A & 1B), and a controller module 400 (FIG. 1C). If desired, a terminal 500 (FIG. 1C) or other type of communication device also may be coupled to the controller module 400 to permit remote control and status checking of the charger system 100. Although the battery charger system 100 can be configured to charge any type of battery, the preferred embodiment of the system charges lead-acid batteries which generally are preferred for seismic data acquisition applications.

Each charger module 200 receives electrical power from the power supply unit 110 and, as shown, can charge one or two rechargeable batteries connected to the ports labeled "Batt Port 1," "Batt Port 2," and so on. Each charger module 200 communicates with the controller module 400 preferably through serial lines coupling each charger module 200 independently to the controller module 400. Each charger module 200 includes a serial interface and analog/digital (A/D) circuit 280 (FIGS. 1A & 1B) and other components best shown in FIGS. 2A–2C. The controller module 400 includes a RS422 line driver circuit 480 (FIG. 1C) to provide serial interfaces to each of the charger modules 200.

In accordance with the preferred embodiment, each charger module 200 includes a Pulse Width Modulator (PWM) Port A and a Pulse Width Modulator (PWM) Port B. Both PWM ports include substantially identical circuitry for charging batteries coupled thereto.

Further, each charger module 200 preferably functions independently from the other charger modules in the battery charger system 100. For example, one charger module 200 can charge a battery while another charger module 200 has been disabled by controller module 400.

Additionally, each charger module 200 preferably is constructed as a physically separate unit or assembly from the other charger modules so that a single charger module 200 can physically be removed from the battery charger system 100 without removing or disturbing the operation of any of the other charger modules 200. As such, a housing (not shown) containing the charger module 200 is designed so as to permit access to each individual charger module 200. Further, a charger module 200 can be removed while other charger modules 200 are charging batteries. Removing one charger module 200 does not effect other charger modules 200 because each charger module 200 communicates separately with the controller module 400 and receives power via an independent power feed from the power supply unit 110. This feature permits charger modules 200 to be "hot swappable" which means a charger module 200 can be removed and replaced without having to turn off the entire charger system 100. Other functional charger modules can continue to charge their batteries when a particular charger module is being replaced. Accordingly, if it is suspected or determined that a particular charger module 200 is defective and requires maintenance or replacement, just that particular charger module 200 is removed from the charger 100 and repaired and/or replaced by a new module.

Being able to "hot swap" individual charger module 200 improves ease of maintenance of the battery charger system 100 over conventional charging systems. The entire battery charger system 100 need not be transported to a service center which would involve a significant cost. Instead, a single charger module 200 can be sent into the field and a repair technician can quickly and easily replace a defective charger module. Maintenance costs are reduced and the entire battery charging capacity of the charger 100 is not disabled while maintenance of a single charger module is performed.

The battery charger system 100 shown in FIG. 1 provides a significant advance in reliability over conventional battery chargers. In accordance with the preferred embodiment and explained in greater detail with respect to FIGS. 2A–C and 3A–B, battery charger system 100 implements two levels of "intelligence." Each level of intelligence is capable of asserting a predetermined level of control over the charging of each battery. Each PWM port preferably includes a "first level of intelligence" (described below) for controlling battery charging. The control module 400 implements a "second level of intelligence" and generally functions in conjunction with the first level of intelligence implemented in the charger modules 200.

Normally, the first level of intelligence implemented in each charger module 200 provides the primary control over battery charging. As such, each charger module is capable of controlling the amount of charging current provided to a battery. The second level of intelligence implemented in the control module 400 receives various parameters from each PWM port over the serial interface between the charger module 200 and control module 400 and enables and disables charging to each port individually. The parameters may include any suitable value such as battery voltage, current, temperature, and pressure. The control module 400 monitors or processes these parameters and turns on and off charging to a particular battery as necessary. For example, the control module may disable charging to a particular battery upon detection of an overvoltage or out of range temperature condition.

The charging system 100 can charge batteries even without the second level of intelligence provided by the control module 400. Further, the second level of intelligence can be used with respect to certain desired charger modules 400, but not others. Thus, some charger modules 200 or PWM ports can be controlled by the second level of intelligence provided by the control module 400 while other charger modules 200 or PWM ports charge batteries according to only their first level of intelligence.

Referring still to FIG. 1, the power supply unit 110 preferably includes a universal voltage/power factor correction module 120 (FIG. 1A) coupled to one or more DC—DC converters 130 (FIG. 1A). The universal voltage/power factor correction module 120 preferably includes a line filter (not shown), such as an 07818 Ham filter manufactured by Vicor and a power factor correction (PFC) module (not shown), such as a VI-HAM-CP 600 watt PFC module also manufactured by Vicor. The line filter attenuates noise from the line voltage which preferably includes an AC (alternating current) voltage in range from about 85 to 265 VAC. The PFC module provides power factor correction to the incoming line voltage and converts the AC line voltage to a DC voltage. The universal voltage/power factor correction module 120 thus provides filtering, power factor correction and can be configured to provide other desired power conditioning functions. Both the filter and PFC module are well known, commercially available components.

The DC—DC converters 130 include any suitable converter for changing the DC voltage provided from the PFC module included in the universal voltage/power factor correction module 120 to a lower DC voltage that is usable by the charger modules 200 and controller module 400. As shown, power supply unit 110 includes three DC—DC converters 130 although the number of converters may vary depending on the number of charger modules 200 included in the battery charger system 100. The DC—DC converters preferably include any suitable converter such as the VI-263-CU which is a 250 VDC-to-24 VDC step down, 200 watt supply module manufactured by Vicor. Because these particular Vicor DC—DC converters 130 are rated only for 200 watts, each DC—DC converter generally is capable of only providing power to two charger modules. Further, because the exemplary embodiment of FIG. 1 includes six charger modules 200, the power supply unit 110 includes three DC—DC converters 130. One of the DC—DC converters 130 also provides power to the controller module 400. Each charger module 200 and controller module 400 includes a 24 VDC input circuit 202 (FIGS. 1A & 1B) and 402 (FIG. 1C), respectively, to condition the 24 VDC power feed from the power supply unit 110.

Figures 2, 2A, 3:
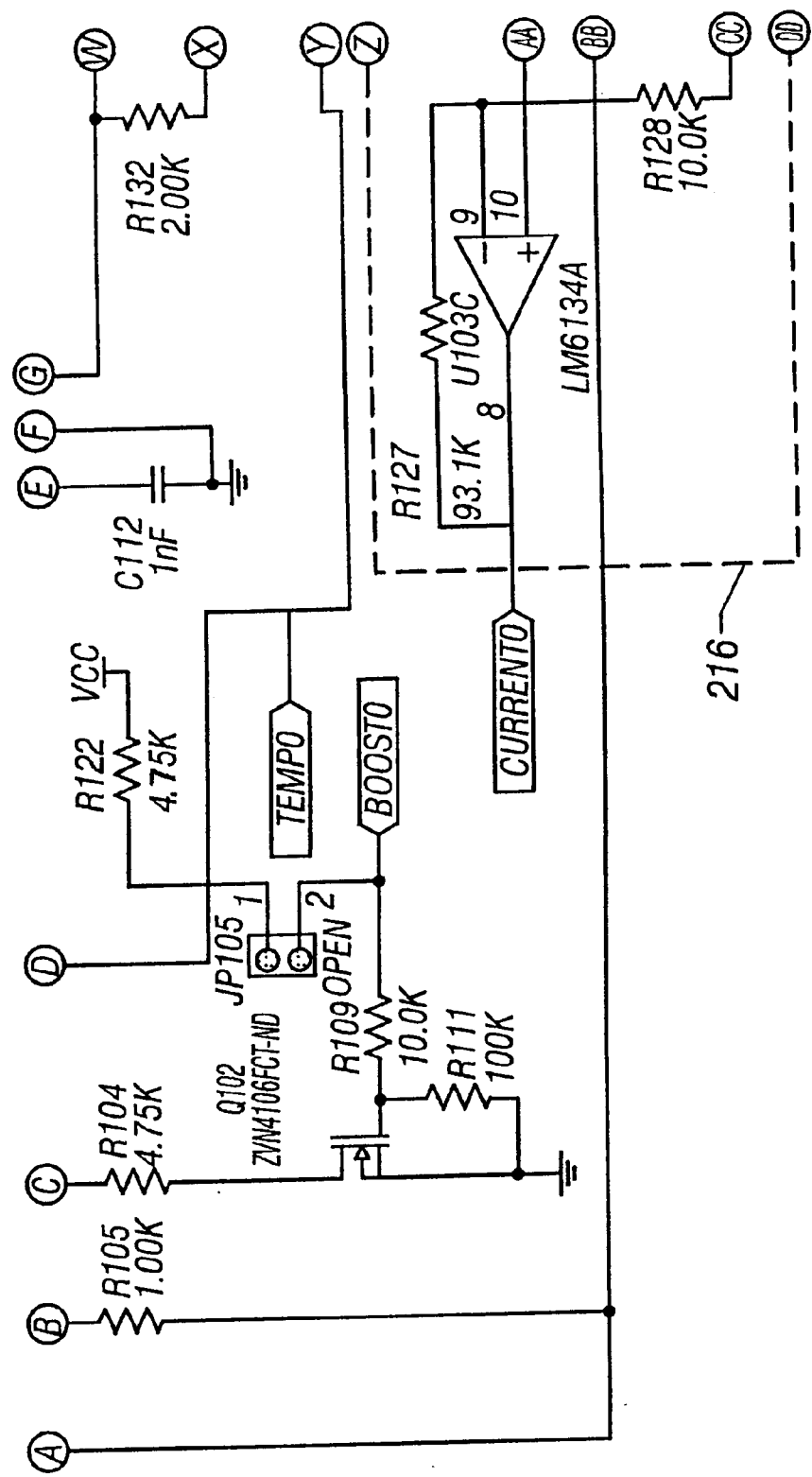
Figures 2, 2A, 3, 4:
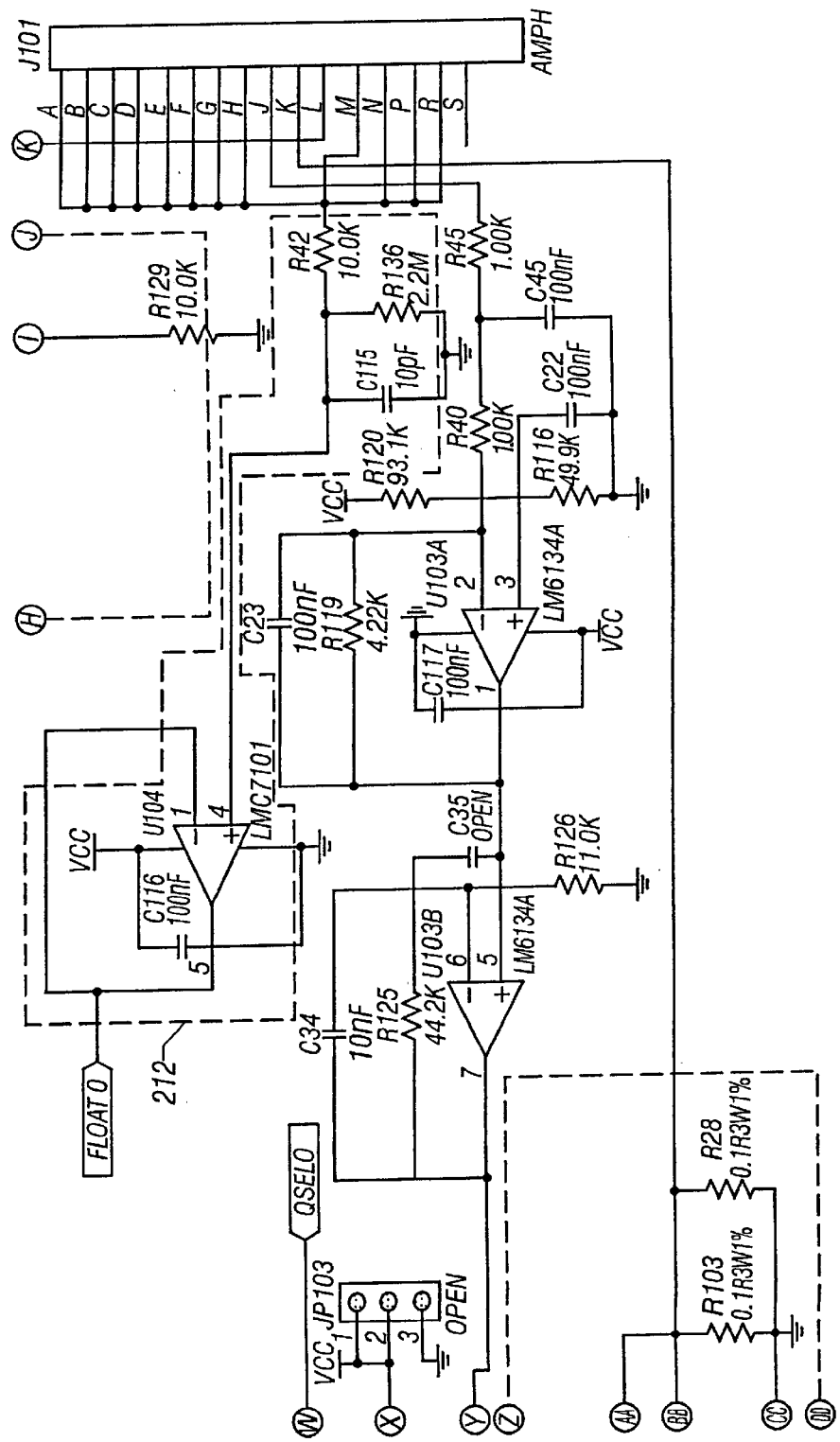
Figures 1, 2B:
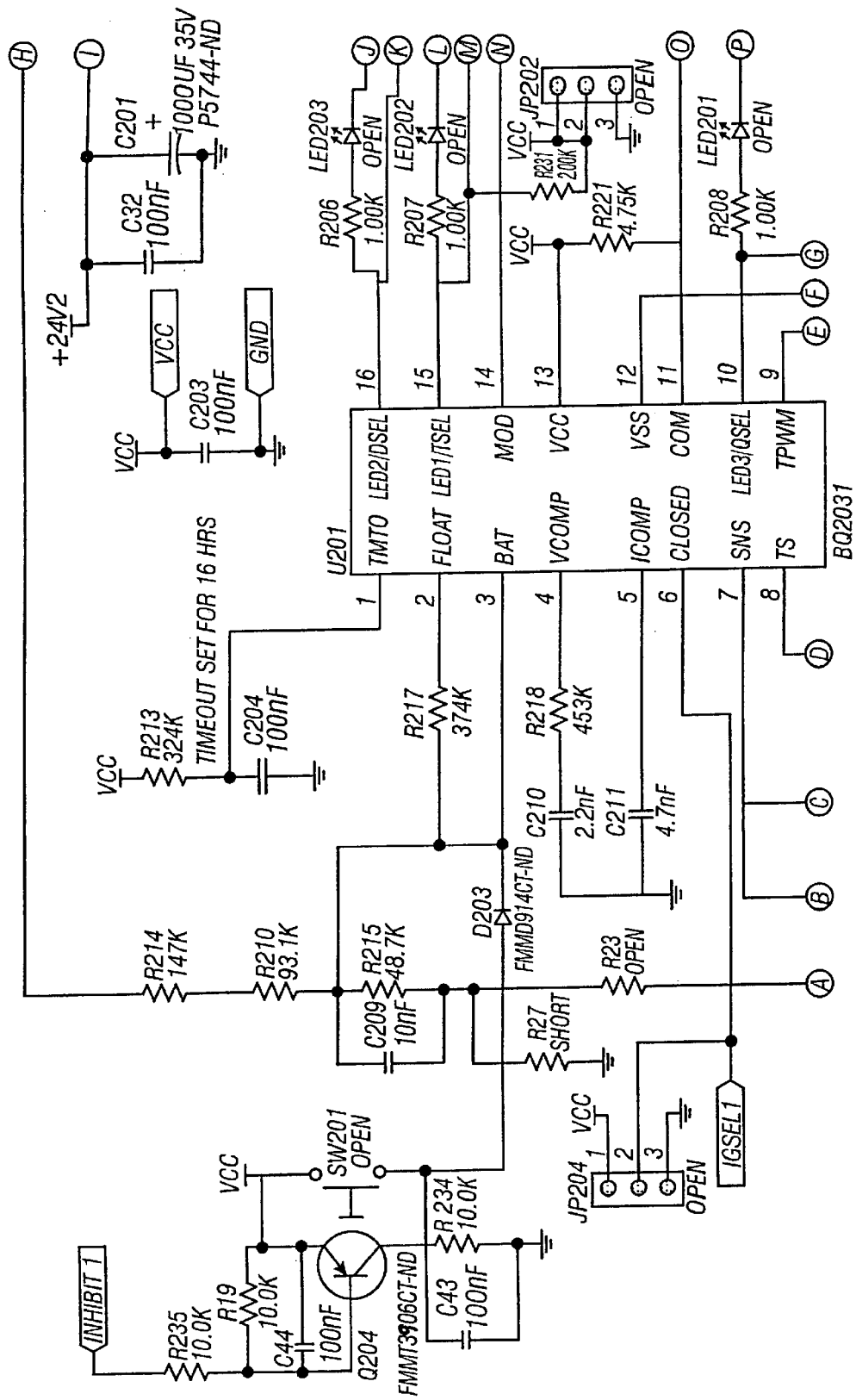
Figures 2, 2B:
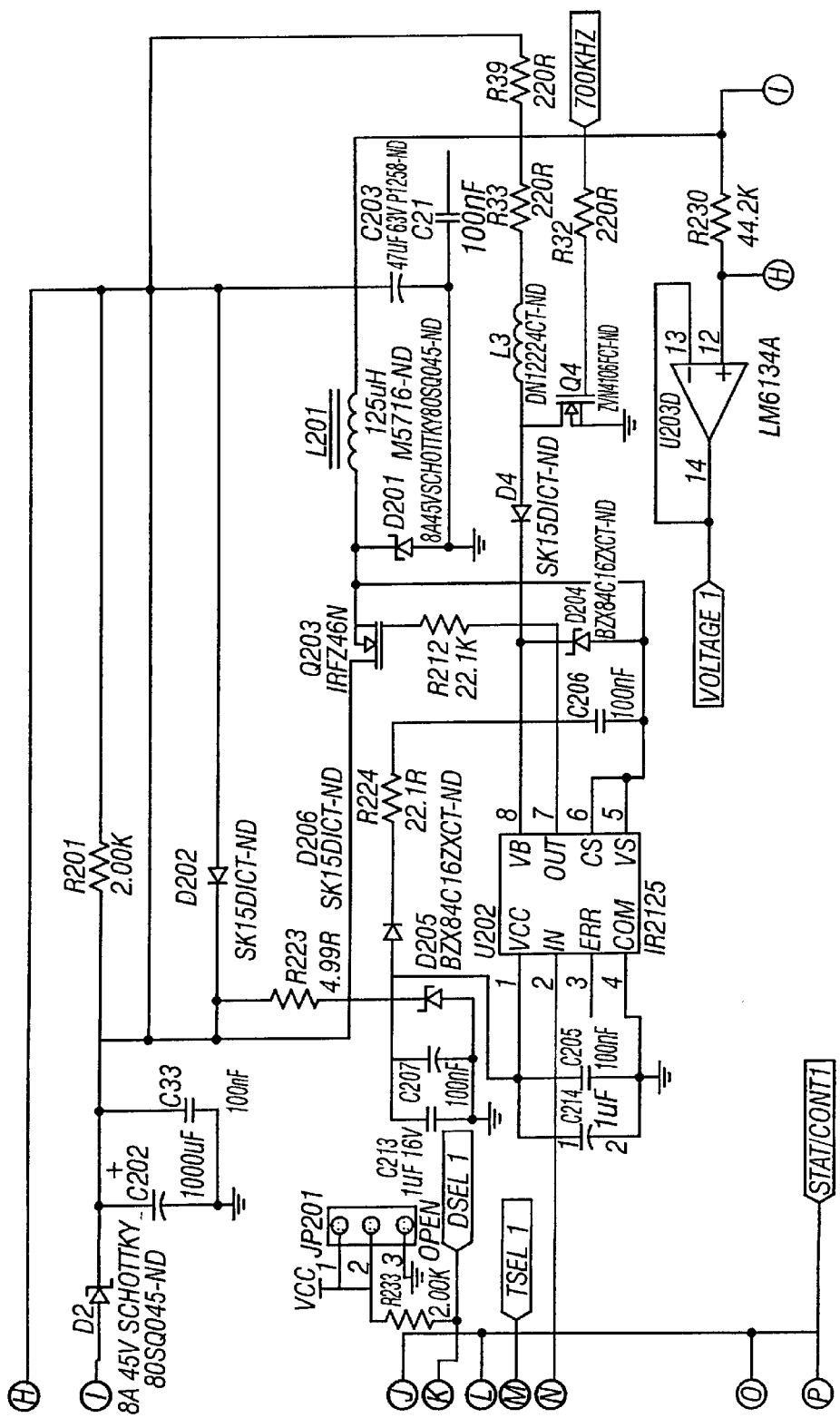
Figures 2, 2B, 3:
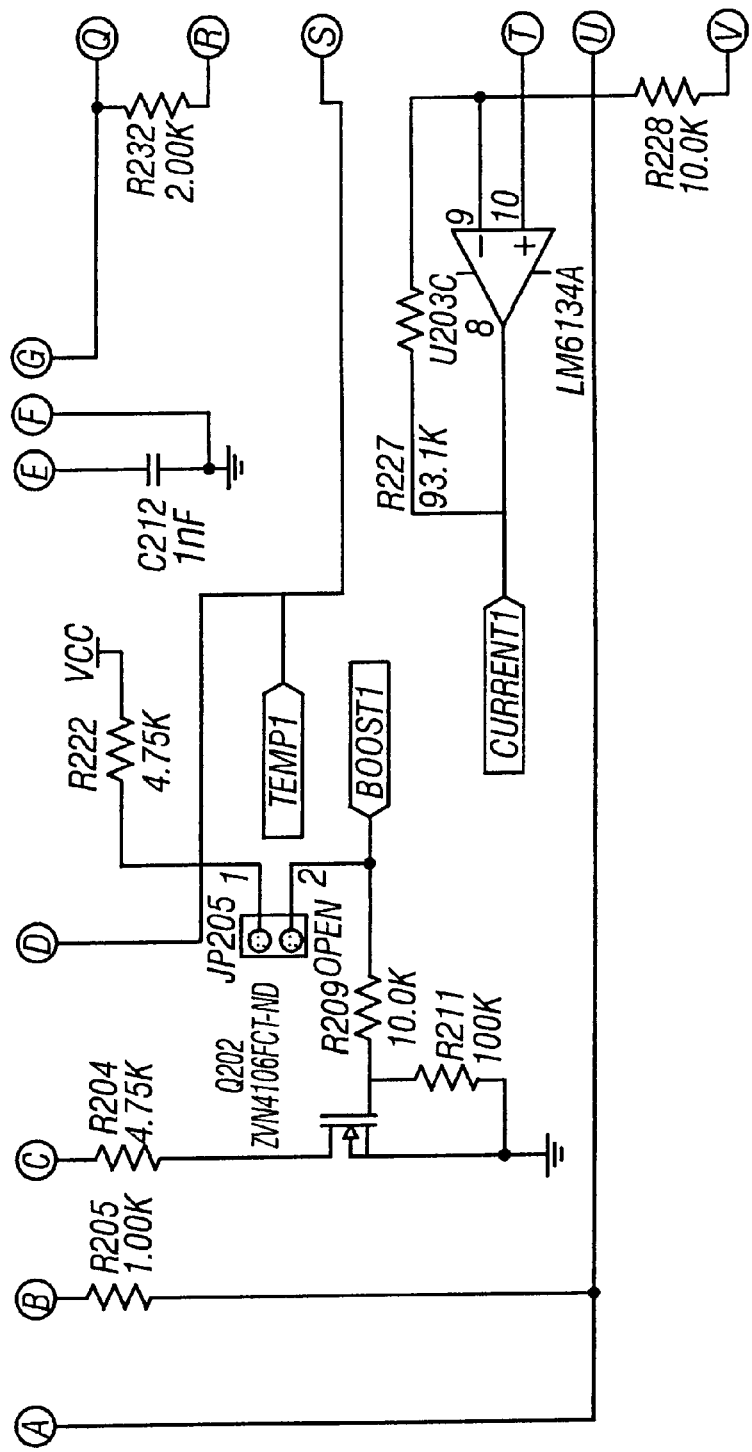
Figures 2, 2B, 3, 4:
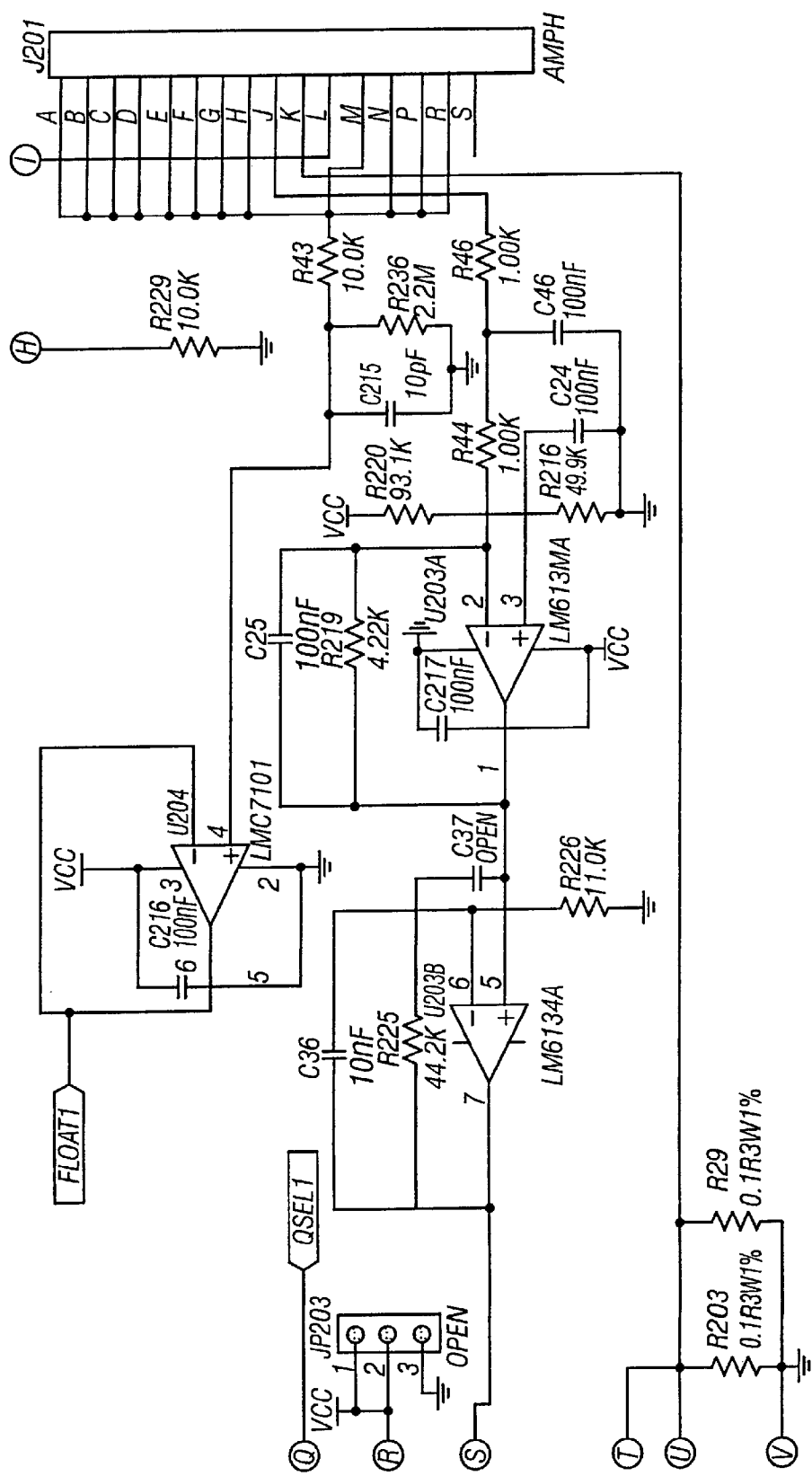
Figures 1, 2C:
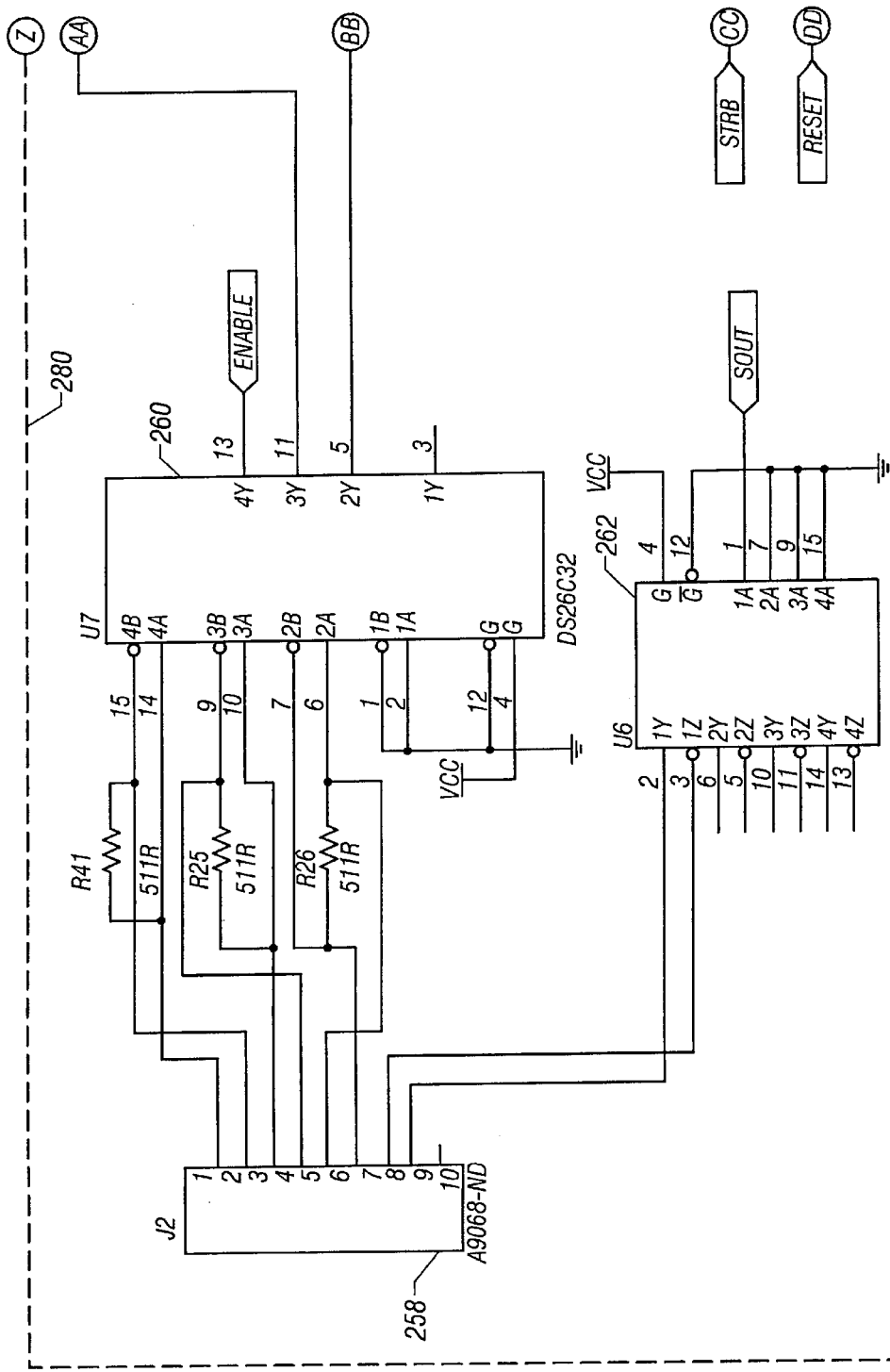
Figures 2, 2C:
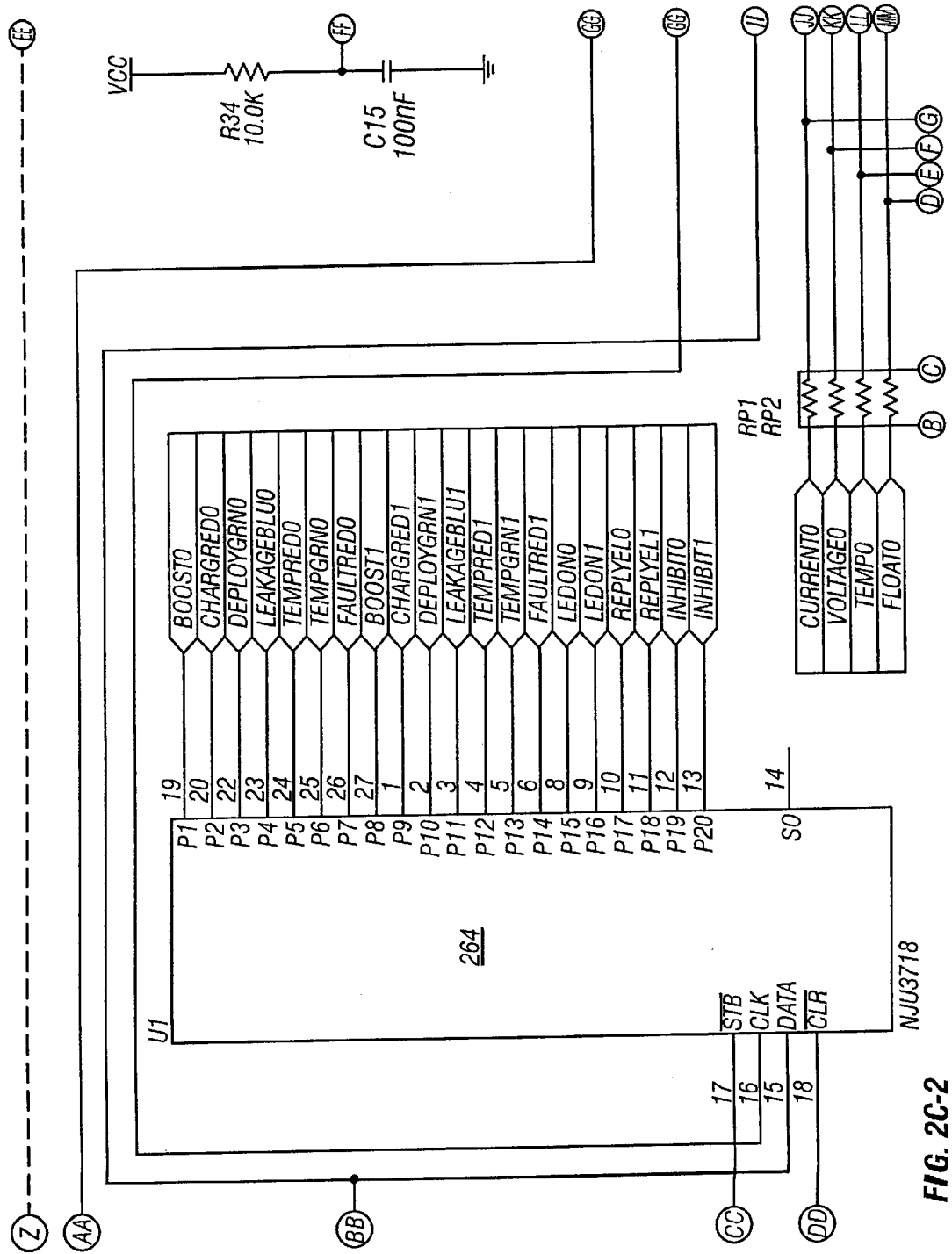
Figures 2, 2C, 3:
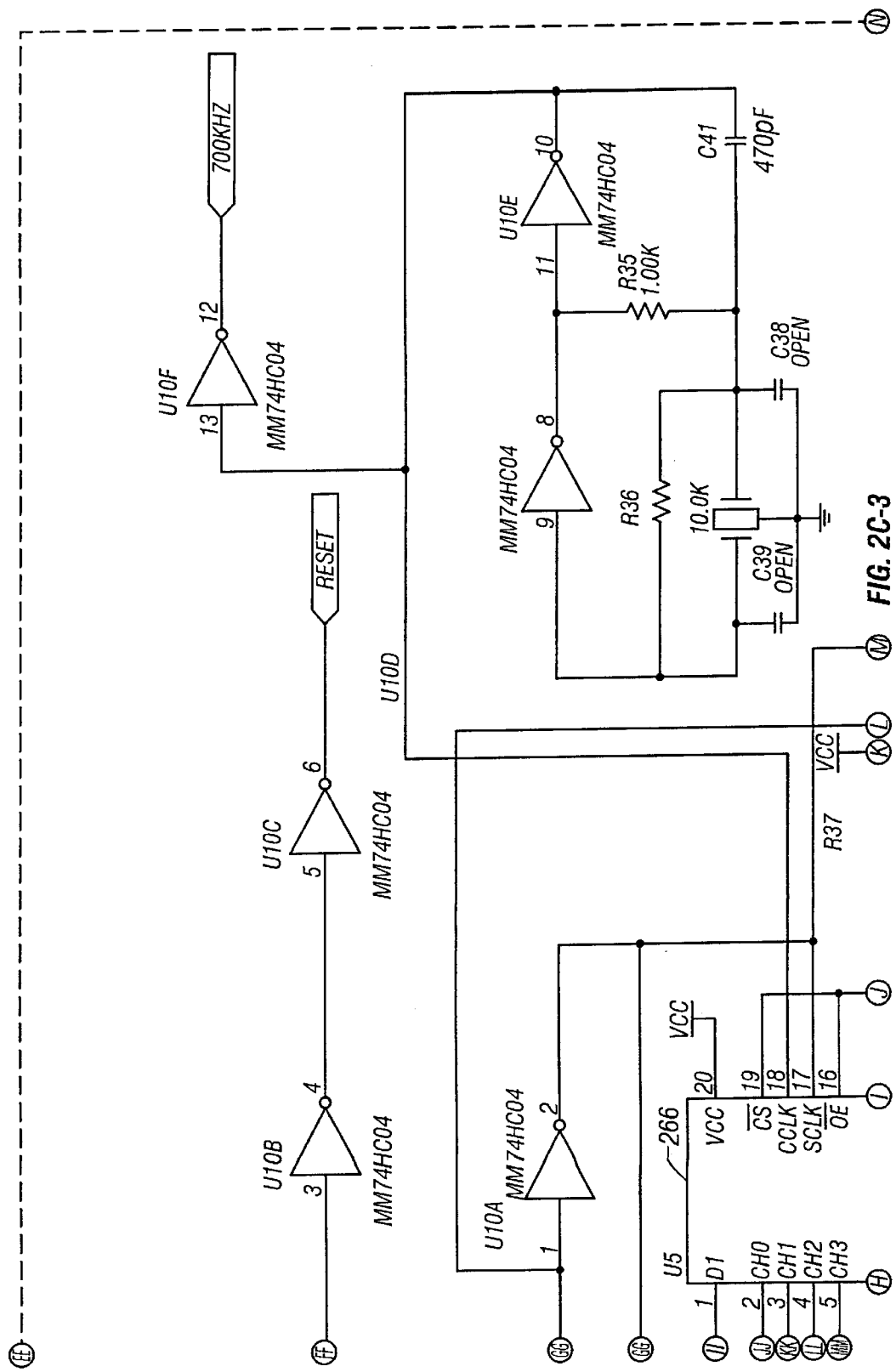
Figures 2, 2C, 3, 4:
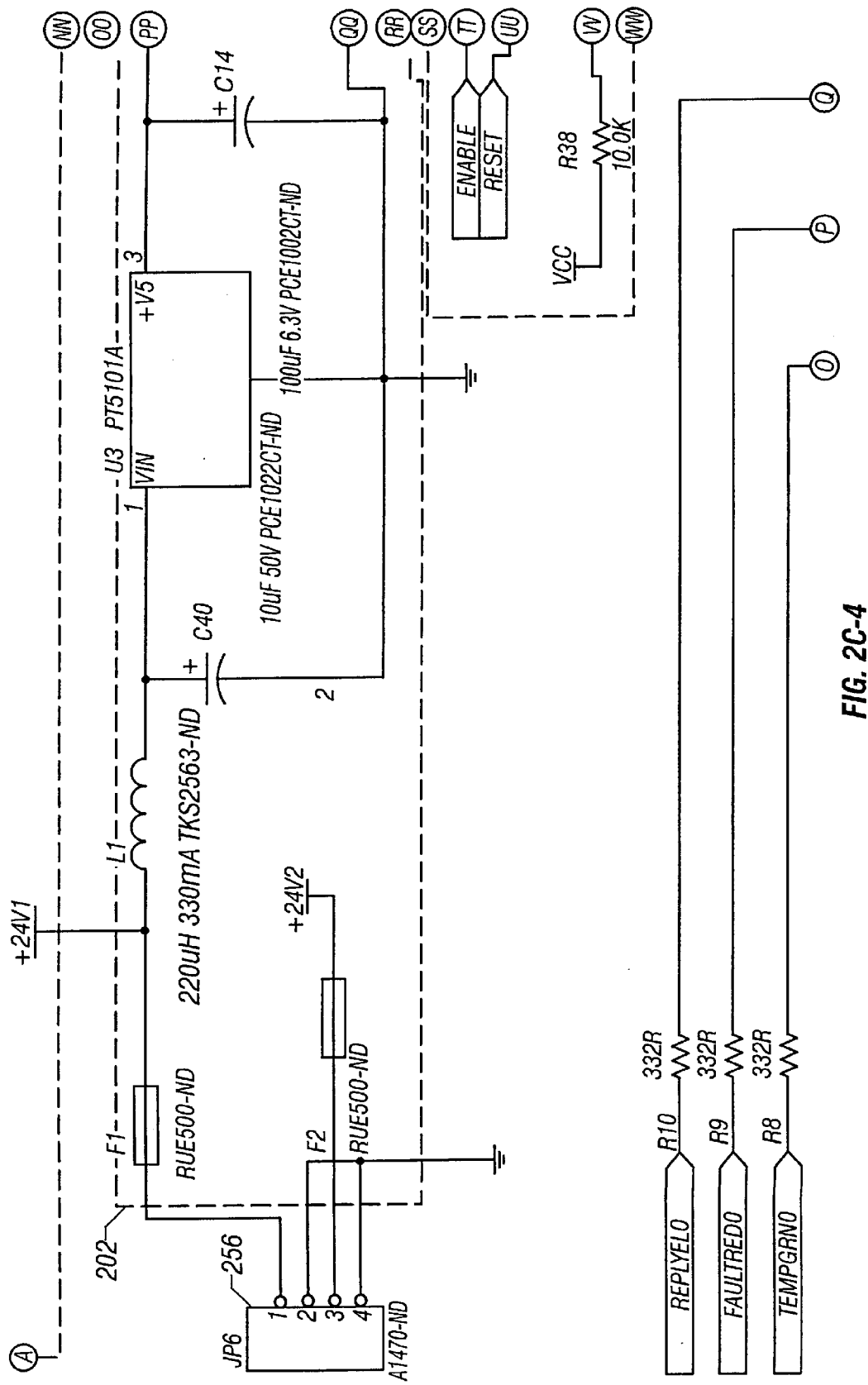
Figures 2, 2C, 3, 4, 5:
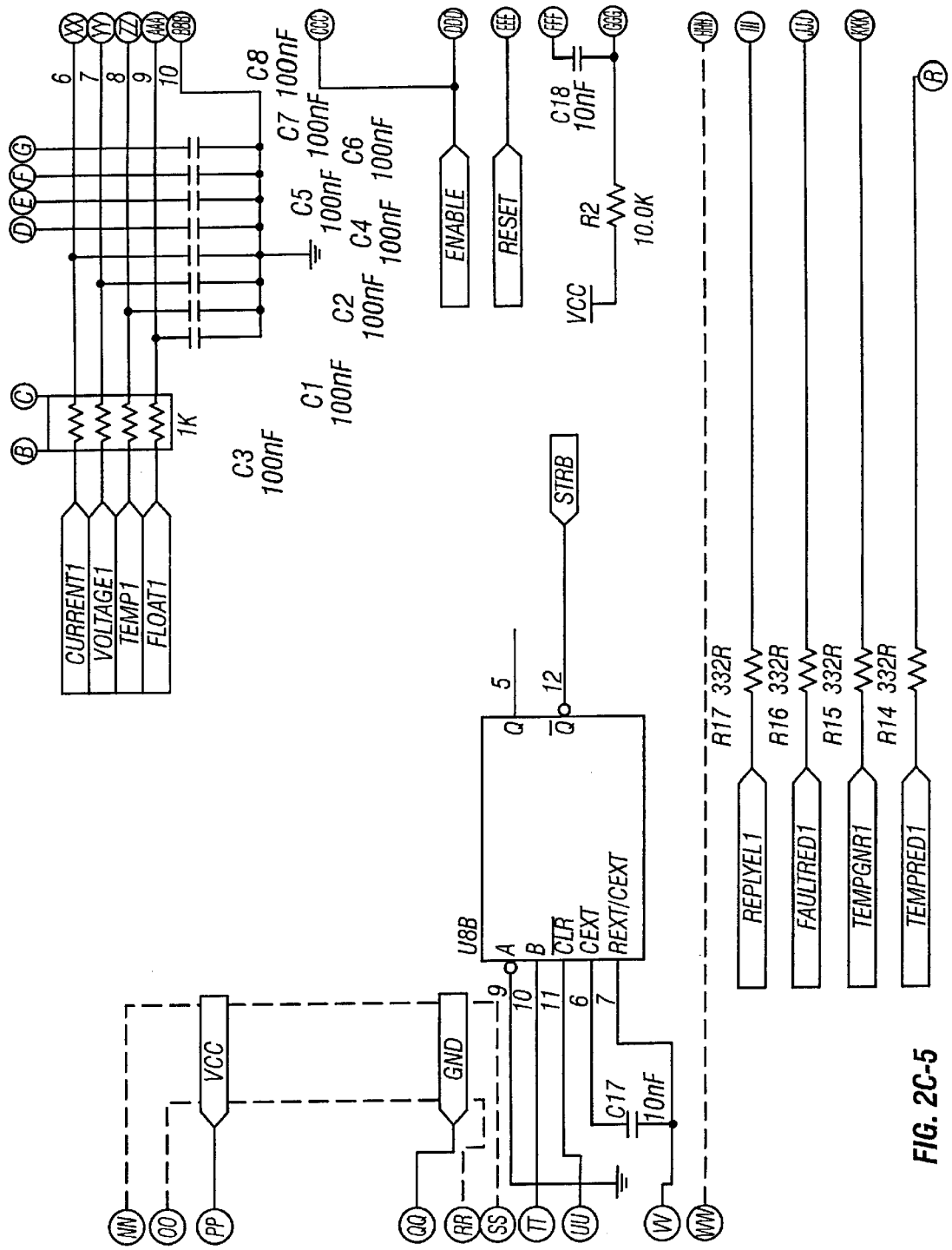
Figures 2, 2C, 3, 4, 5, 6:
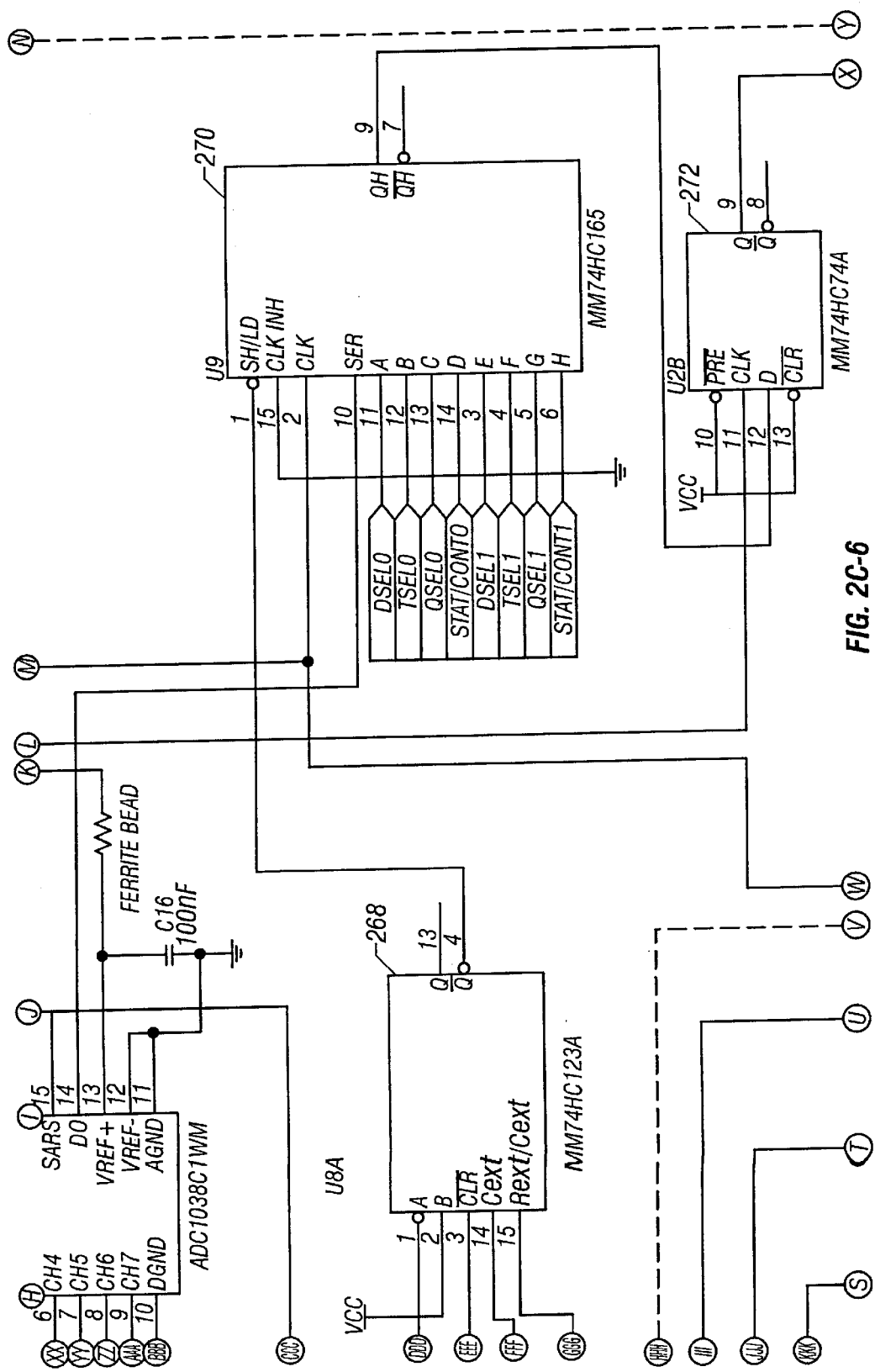
Figures 2, 2C, 3, 4, 5, 6, 7:
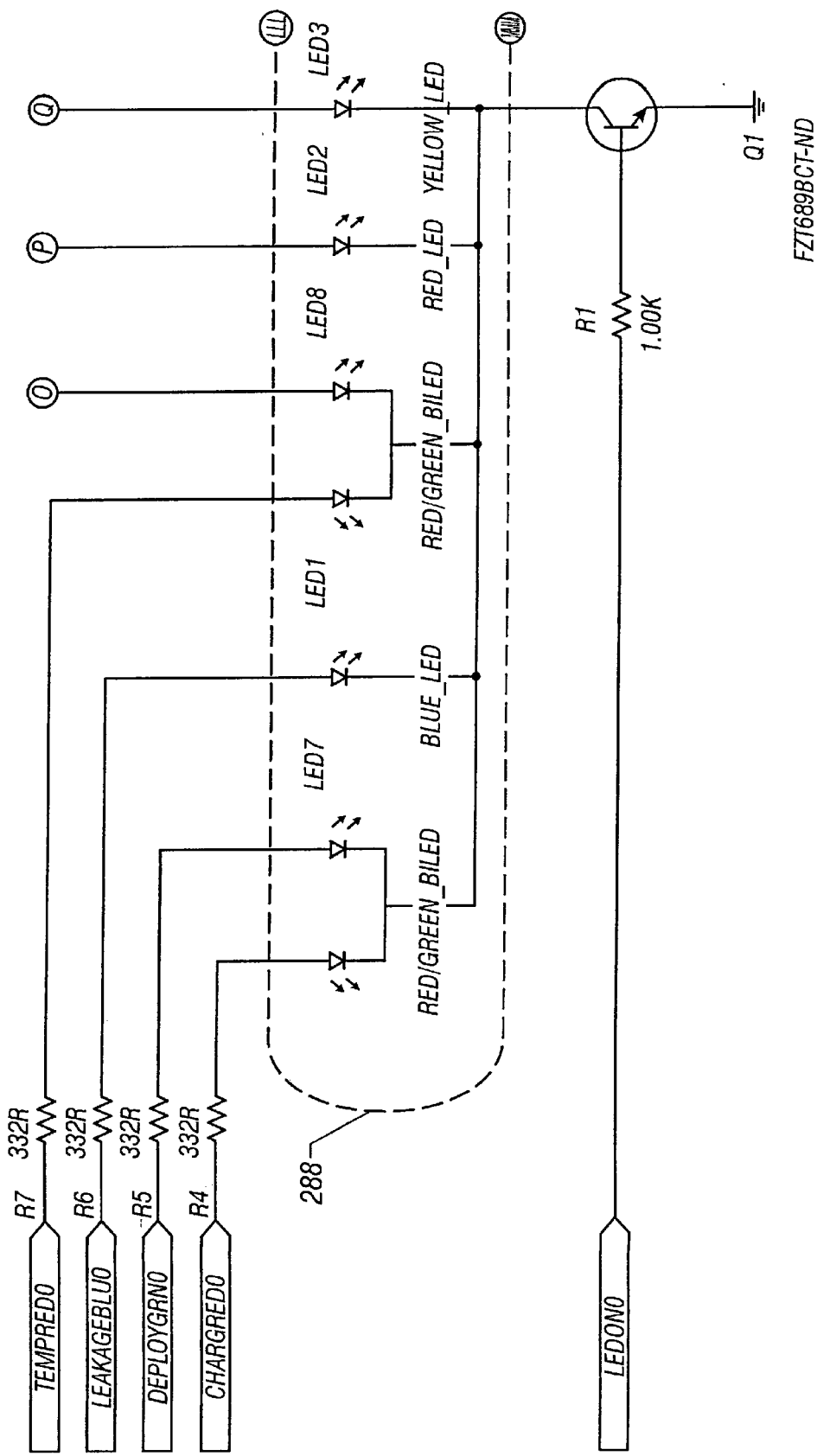
Figures 2, 2C, 3, 4, 5, 6, 7, 8:
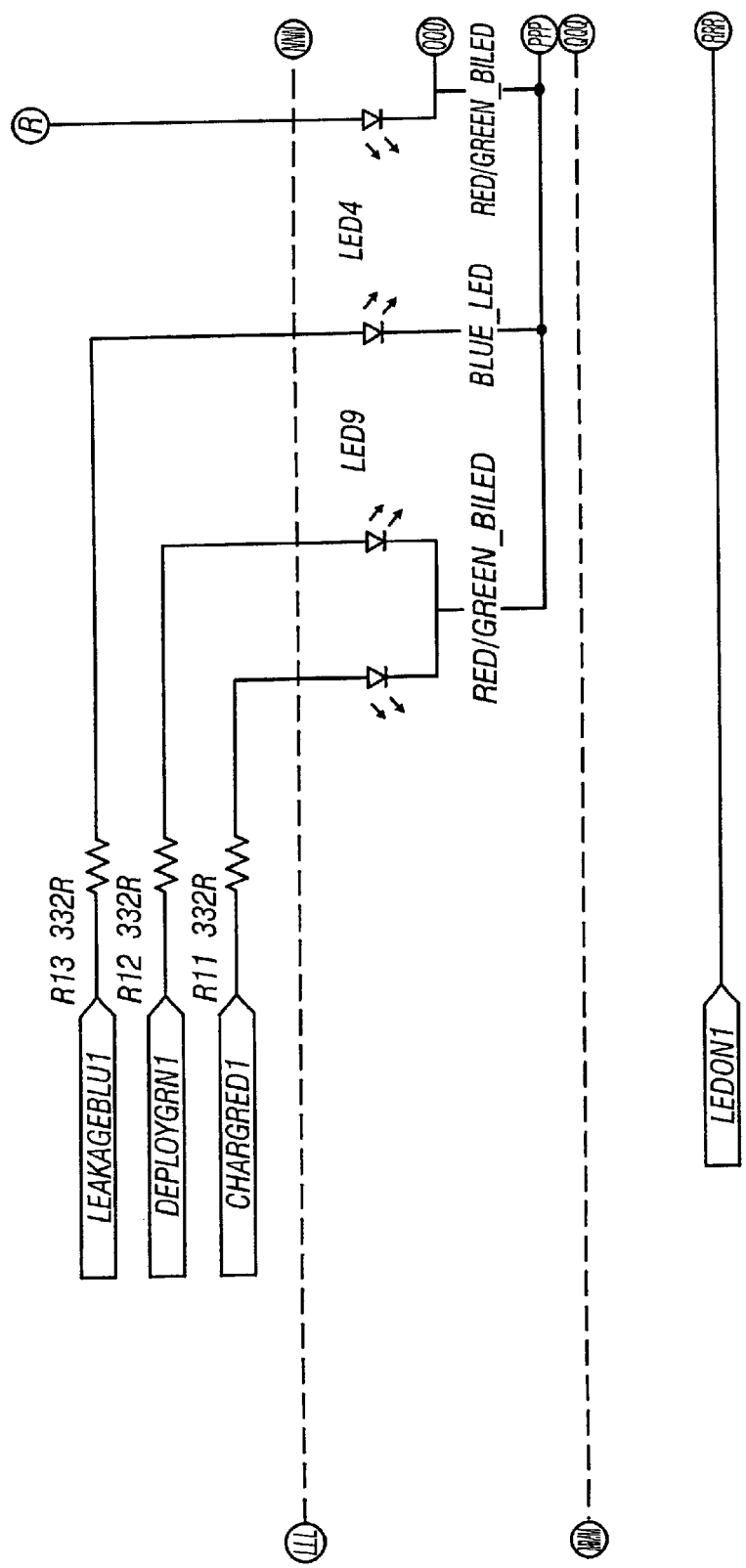
Figures 2, 2C, 3, 4, 5, 6, 7, 8, 9:
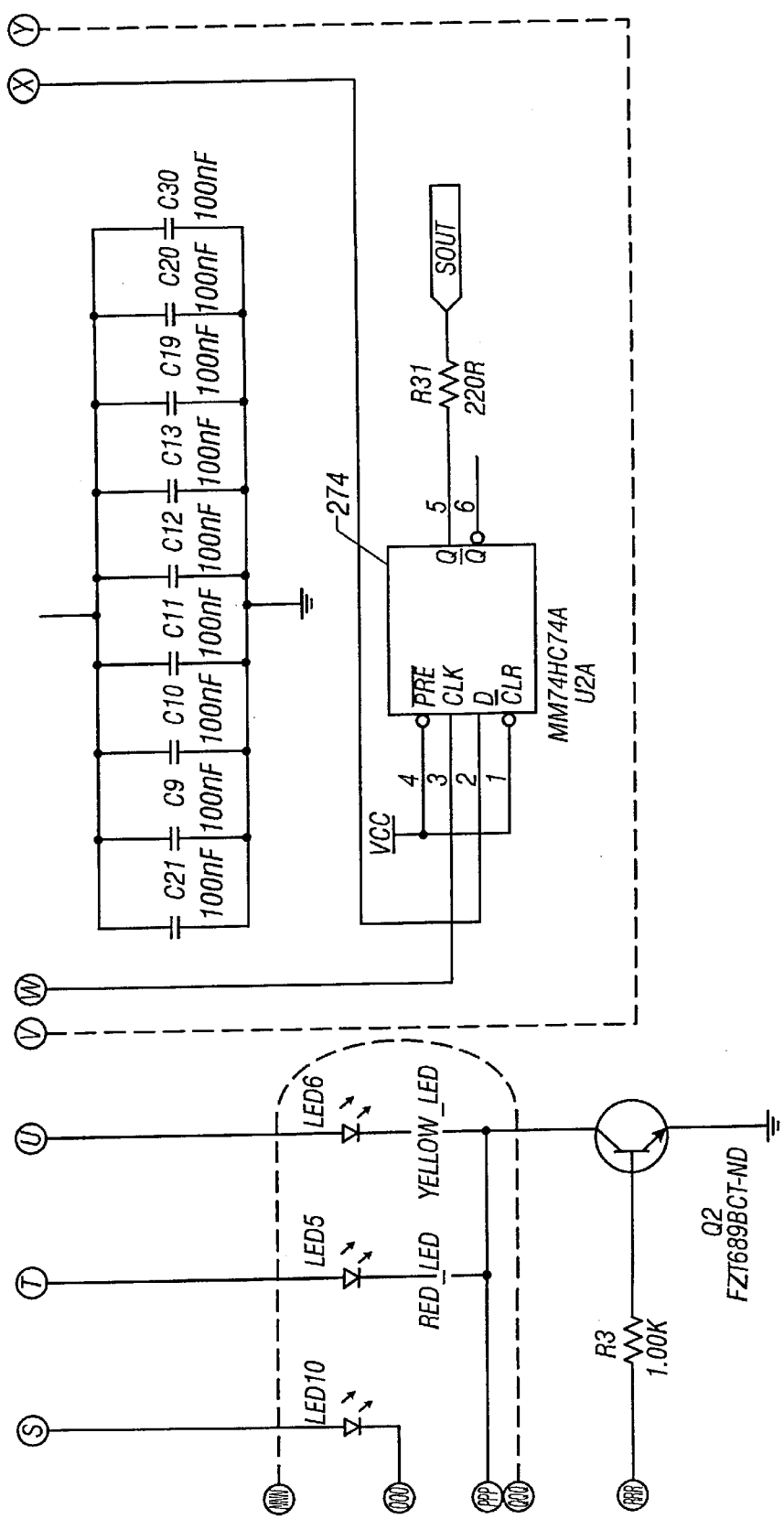

Referring now to FIGS. 2A–2C a preferred circuit schematic implementation of a dual PWM port, single charger module 200 is shown. FIG. 2A shows the schematic for one of the PWM ports and FIG. 2B includes the schematic for the other PWM port. FIGS. 2A and 2B are substantially identical and thus only FIG. 2A will be discussed. FIG. 2C generally includes the serial interface control and A/D 280 along with one or more status light emitting diodes (LED's) 288 and associated circuitry. The component part numbers and values shown in the FIGS. 2A–2C, as well as in FIGS. 3A–3B (discussed below), are exemplary only of one embodiment of the invention. Upon reading the following discussion of the schematics, one of ordinary skill in the art will appreciate that there are many other component values and parts that can be used besides the values and parts shown in the Figures. Further, the circuit topologies shown can be changed in any suitable matter yet still implement the principles and functions discussed herein.

Referring now to FIG. 2A, which is comprised of four subfigures entitled FIGS. 2A-1 through 2A-4, charger module 200 includes a 24 VDC input circuit 202 (FIG. 2A-2 and a portion of which is also shown in FIG. 2C-4), an inhibit circuit 204 (FIG. 2A-1), a voltage monitor circuit 206 (FIG. 2A-2), an inductor coil 210 (FIG. 2A-2), a leakage detection circuit 212 (FIG. 2A-4), a current monitor circuit 216 (FIG. 2A-3), a charge control integrated circuit (IC) 220 (FIG. 2A-1), and other components as shown. The charge control IC 220 preferably is the lead-acid fast-charge IC bq2031 manufactured by Benchmarq, although any other suitable charge control IC could be used as well.

Connector J101 is used for connection to the rechargeable battery. The connector pin labeled L couples to the positive terminal of the battery and the pin labeled K couples to the battery negative terminal. Pins M, N, P, and R preferably are tied together and coupled to the leakage detection circuit 212 and not the battery. Any current that is present on pins M, N, P, R represents undesirable leakage current and is detected by leakage detection circuit 212. Generally, charge current is provided from the +24 VDC source provided by the power supply unit 110 and conditioned by 24 VDC input circuit 202 which comprises a low voltage drop Schottky diode D1, diode D102 and capacitors C27, C101, C102, C28, and resistor R101. The charger module 200 preferably transmits an indication of the presence of leakage current to the controller module 400 which, in turn, may initiate signaling a user of the leakage condition or may shut off charging to the affected battery, thereby decreasing the potential for further harm to that battery and increasing overall system safety and reliability.

Node 203 (FIG. 2A-2) represents the connection point between the cathode terminal of Schottky diode D1, the non-grounded terminal of capacitors C28, C102, the cathode of diode D102 and resistor R123. The charge current from the 24 VDC input circuit 202 flows from node 203 through field effect transistor (FET) Q103, through inductor coil 210 and to the positive terminal of the battery via pin L of connector J101. The current from the negative terminal of the battery returns via pin K of connector J101 and through resistors R28 and R103 to ground. Resistors R28 and R103 preferably are 0.1 ohm resistors connected in parallel and function as current sensing resistors. As such, the voltage developed across these resistors in response to return current from the battery is proportional to the battery current. That voltage is amplified by operational amplifier U103C which is connected to resistors R127 and R128 in a non-inverting amplifier configuration. With resistor R127=93.1 kohms and R128=10 kohms, the gain is approximately 10.3. The output signal from operational amplifier U103 is labeled CURRENT0 and thus is a voltage that is proportional to the current through the battery.

Referring still to FIG. 2A, the battery voltage is scaled by a voltage divider network comprising resistors R129 and R130 which, given the component values for R129 and R130 shown in FIG. 2A, reduce the battery voltage to a value that is approximately 20% of the actual battery voltage. The scaled battery voltage is then provided to a high input impedance voltage follower buffer U103D. The output signal from U103D is labeled VOLTAGE0 and thus represents a scaled down version of the battery voltage. The battery voltage could also be scaled up if desired by replacing the voltage divider network with an amplifier with a gain that is greater than 1.

The charger control IC 220 controls the amount of charging current provided to the battery from 24 VDC input circuit 202 by turning FET Q103 on and off at a desired rate and with a desired duty cycle (i.e., the percentage of time the FET is on and conducting relative to the time it is off). In accordance with the presently preferred embodiment, charger control IC 220 is the bq2031 lead-acid fast-charge integrated circuit (IC) manufactured Benchmarq. The bq2031 IC 220 provides selectable charging algorithms including a two-step voltage with temperature compensated constant-voltage maintenance algorithm, a two-step current with constant-rate pulsed current maintenance, and pulsed current. These algorithms include multiple stages of charging and are controlled by the bq2031 IC 220. The bq2031 220 provides the first level of intelligence noted above for charging the battery connected to J101. As such, the bq2031 220 in conjunction with the other circuitry shown in FIG. 2A is capable of charging the battery without assistance from the control module 400. A complete description of the Benchmarq bq2031 charging IC can be found in the data sheet associated with that part, Benchmarq bq2031 Lead-Acid Fast-Charge IC (April 1997), incorporated herein by reference.

In general, the battery voltage is provided to the charger module 220 via pin L of J101 and resistors R114 and R110 to the battery (BAT) input pin (pin 3) of charge control IC 220. The modulator (MOD) signal from pin 14 is a pulse-width modulated push/pull output signal that is used to control the charging current to the battery. The MOD output pin (pin 14) connects to the input pin (pin 2) of the high side gate driver U102. The high side gate drive U102 boosts the 5 V peak-to-peak PWM signal from the MOD output pin to approximately 18 V peak-to-peak which is used to drive the gate of FET Q103. The output drive of U102 also permits the 18 V PWM signal (pin 7) to rise up with the source voltage of FET Q103 (pins 5 and 6 of U102) to provide a consistent 18 V gate to source PWM signal to this type of FET circuit configuration. The high side gate driver U102 also provides sufficient current to turn power FET Q103 on and off. The MOD signal thus represents the current-switching control output signal from charge control IC 220. The MOD signal switches high to enable current flow to the battery and low to inhibit current flow.

The charge control IC 220 controls charging by pulse-width modulation of the MOD output signal, and supports both constant-current and constant-voltage regulation. The charge control IC 220 monitors charging current by monitoring the voltage at the current sense (SNS) pin (pin 7), and charge voltage at the BAT pin. These voltages are compared to an internal temperature-compensated reference, and the MOD output signal is modulated to maintain the desired value of charge current. The battery current is sensed via a voltage developed on the SNS pin by resistor R105.

The switching frequency of the MOD output signal is specified by the value of capacitor C112 connected between the TPWM pin (pin 9) and ground. Although the switching rate can be any rate within a range from about 10 kHz to about 200 kHz, a switching rate of 100 kHz is preferred and is set accordingly by making capacitor C112 a nanofarad capacitor. To prevent oscillation in the voltage and current control loops, resistor R118 and capacitors C110 and C111 are provided between the VCOMP and ICOMP input pins 4 and 5 which permit voltage loop and current loop stability, respectively.

The charger control IC 220 is cable of charging the battery in any one of a variety of selectable modes. Each charging mode is selected by asserting the QSEL and TSEL input signals on pins 10 and 15 of the charger control IC 220. Table I identifies the various charging modes provided by the bq2031 and the QSEL and TSEL voltage levels necessary to select each mode.

TABLE I

Charger Control IC 220 Charging Mode Selection

| Algorithm/State | QSEL | TSEL | Conditions | MOD Output |
|---|---|---|---|---|
| Two-Step Voltage Fast charge, phase 1 | L | H or L | While VBAT < VBLK, ISNS = IMAX | Current regulation |
| Fast charge, phase 2 | | | While ISNS > IMIN, VBAT = VBLK | Voltage regulation |
| Primary termination | | | ISNS = IMIN | |
| Maintenance | | | VBAT = VFLT | Voltage regulation |
| Two-Step Current Fast charge | H | L | While VBAT < VBLK, ISNS = IMAX | Current regulation |
| Primary termination | | | VBAT = VBLK or $\Delta^2 V <- 8$ mV | |
| Maintenance | | | ISNS pulsed to average IFLT | Fixed pulse current |
| Pulsed Current Fast charge | H | H | While VBAT < VBLK, ISNS = IMAX | Current regulation |
| Primary termination | | | VBAT = VBLK | |
| Maintenance | | | ISNS = IMAX after VBAT = VFLT; ISNS = 0 after VBAT = VBLK | Hysteretic pulse current |

As shown in FIG. 2A QSEL and TSEL signals are preset by jumpers JP103 and JP102, but could be selectable by controller module 400 if desired.

Charging mode status is provided visually at the charger module 200 by LED 101, LED 102 and LED 103 which are coupled to the QSEL, TSEL and DSEL LED output drive pins of charge control IC 200 by current limiting resistors R108, R107, and R106. These status LED's generally indicate what stage of charging the charge control IC 220 currently is performing as is described in the bq2031 data sheet.

The battery connector J101 preferably includes one or more pins that are not connected to the battery and thus generally are unused. As shown in FIG. 2A, these pins are labeled M, N, P, and R. Any leakage current that may develop on the battery connector J101 is detected by leakage detection circuit 212. The leakage detection circuit 212 generally converts any current provided from any of the unused pins M, N, P, and/or R on connector J101 to a voltage. Resistors R42 and R136 preferably comprise a current-to-voltage converter. The voltage developed across resistor R136 is proportional to the leakage current from pins M, N, P, R. Operational amplifier U104 preferably is configured as a high input impedance voltage follower, the output signal of which is labeled FLOAT0. Thus, FLOAT0 is a voltage that is indicative of any leakage current that may happen to develop on the battery connector J101.

To accurately control charging current, it is important to determine the battery voltage at the battery terminals and not at the charger end of the cable that connects the battery to the charger. The voltage usually differs from one end of the battery cable to the other because of the inherent impedance of the battery cables which causes a voltage drop along the cable. Conventional battery chargers have solved this problem by including separate "sense" lines from the battery terminals to a high impedance voltage monitor circuit in the charger. These sense lines are in addition to the battery cable that provides charging current to the battery. Because the impedance of the voltage monitor is relatively high, negligible current flows through the sense lines and the voltage at the end of sense lines connected to the voltage monitor is substantially the same as the actual battery voltage. Sense lines are susceptible to breakage and thus cause reliability problems with conventional chargers.

Referring to FIG. 2C, which is comprised of nine subfigures entitled FIGS. 2C-1 through 2C-9, the serial interface control and A/D logic 280 (FIG. 2C-1) and status LED's 288 (FIG. 2C-7) are shown. The serial interface control and A/D logic 280 preferably includes a receiver 260 (FIG. 2C-1), a transmitter 262 (FIG. 2C-1), a serial-to-parallel converter 264 (FIG. 2C-2), an analog-to-digital converter (ADC) 266 (FIG. 2C-3), a monostable multivibrator 268 (FIG. 2C-6), an 8-bit parallel-to-serial shift register 270 (FIG. 2C-6), D-latches 272 (FIG. 2C-6) and 274 (FIG. 2C-9) and various other discrete components as shown. Although the circuit shown represents the preferred interface and A/D logic for each charger module 200, any other circuit that performs the similar functions to that shown in FIG. 2C is acceptable as well.

Referring still to FIG. 2C, signals from the controller module 400 are received by receiver 260 which preferably is a DS26C32 manufactured by National Semiconductor. The data received is in a serial format and is converted to a parallel format by serial-to-parallel converter 264. As shown, some of the data received from the controller module 400 represents status information such as whether leakage current has been detected (LEAKAGEBLU0 and LEAKAGEBLU1) and whether a temperature has been detected that is outside a specified preferred range (TEMPRED0 and TEMPRED1). Because each charger module 200 can charge two batteries, two sets of status information are transmitted from the controller module 400—one set is related to one of the two batteries and the other information set is related to the other battery. Much of the status data decoded by the serial-to-parallel converter 264 is used to drive various status LED's 288 which preferably are mounted on a front panel (not shown) of the charger system 100.

The controller module 400 is able to inhibit charging when desired. Disabling charging may be desirable when an overtemperature, overvoltage, or any other predefined condition is detected. The controller module 400 disables charging by providing an INHIBIT signal to the targeted charger module 200 to be disabled. As shown in the preferred embodiment of FIG. 2C, two individual INHIBIT signals, INHIBIT0 and INHIBIT1 are provided to turn on or off each PWM port separately. The INHIBIT signal is provided to the inhibit circuit of FIG. 2A, and when asserted disables the charger IC 220 from charging the associated battery. Through the INHIBIT signals, the controller module 400 provides the second level of intelligence discussed above.

Referring still to FIG. 2C, various charging parameters, such as battery current (CURRENT0 and CURRENT1) and voltage (VOLTAGE0 and VOLTAGE1), temperature (TEMP0 and TEMP1), and the leakage current (FLOAT0 and FLOAT1) are provided in analog form to the ADC 266. The ADC 266 converts those signals to a digital representation which then is provided from the data out (DO) pin of ADC 266 to the serial input pin (SER) of parallel-to-serial shift register 270. The shift register 270 generates preferably a single serial bit stream including all data and information desired to be transmitted to the controller module 400. Other parameters or status information may be provided to shift register 270 for transmission to the controller module 400 in addition to the serial data provided by the ADC 266. As shown, the QSEL and TSEL signal values are also provided to shift register 270. The monostable multivibrator 268 preferably provides a control signal from its Q' output pin (pin 4) to pin 1 of the shift register 270 to initiate and control the shifting of the data through the shift register. As the data is shifted through the shift register 270, it is latched by D latches 272 and 274 for transmission through transmitter 262 to the controller module 400.

Figures 1, 3A:
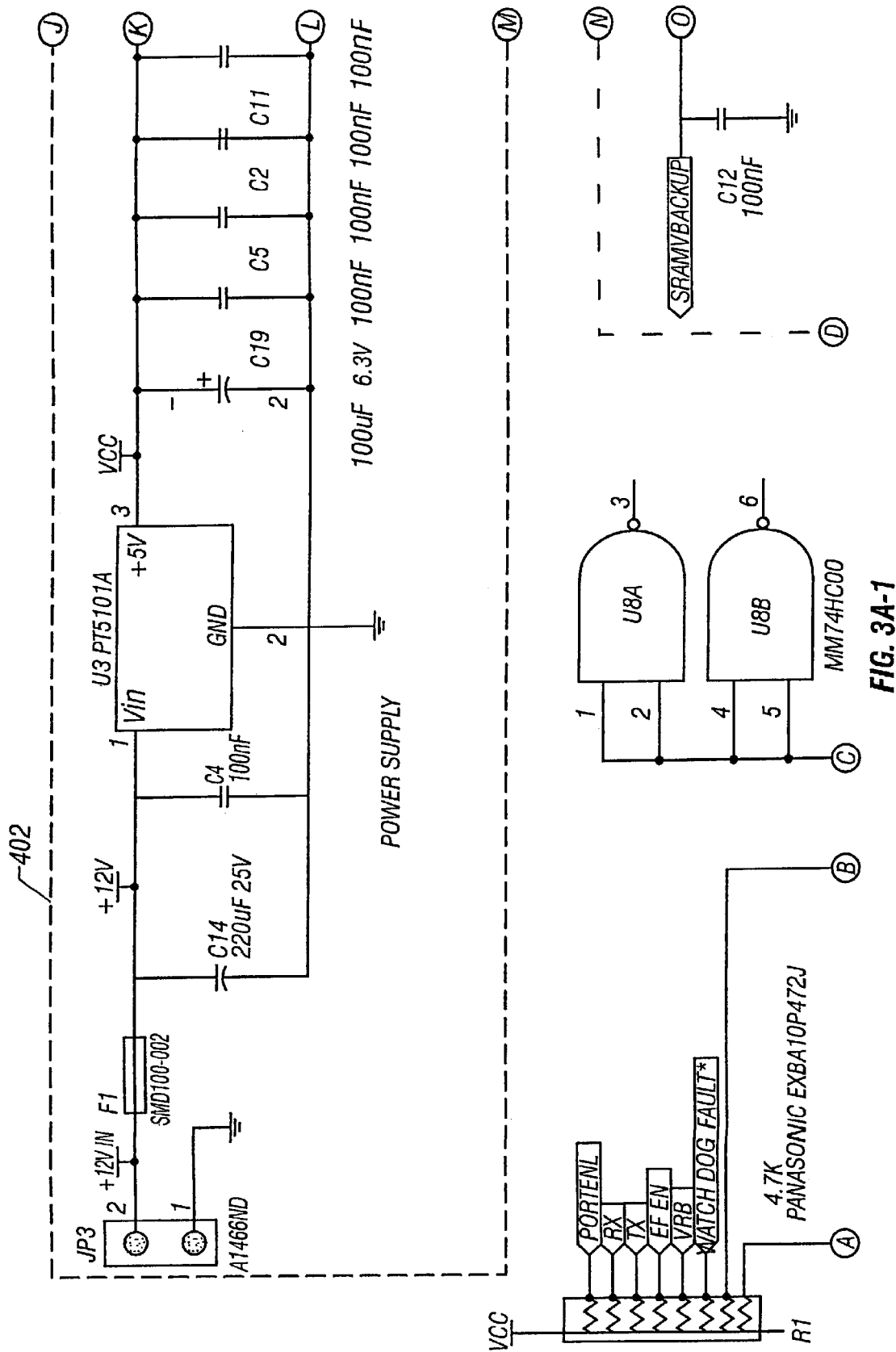
Figures 2, 3A:
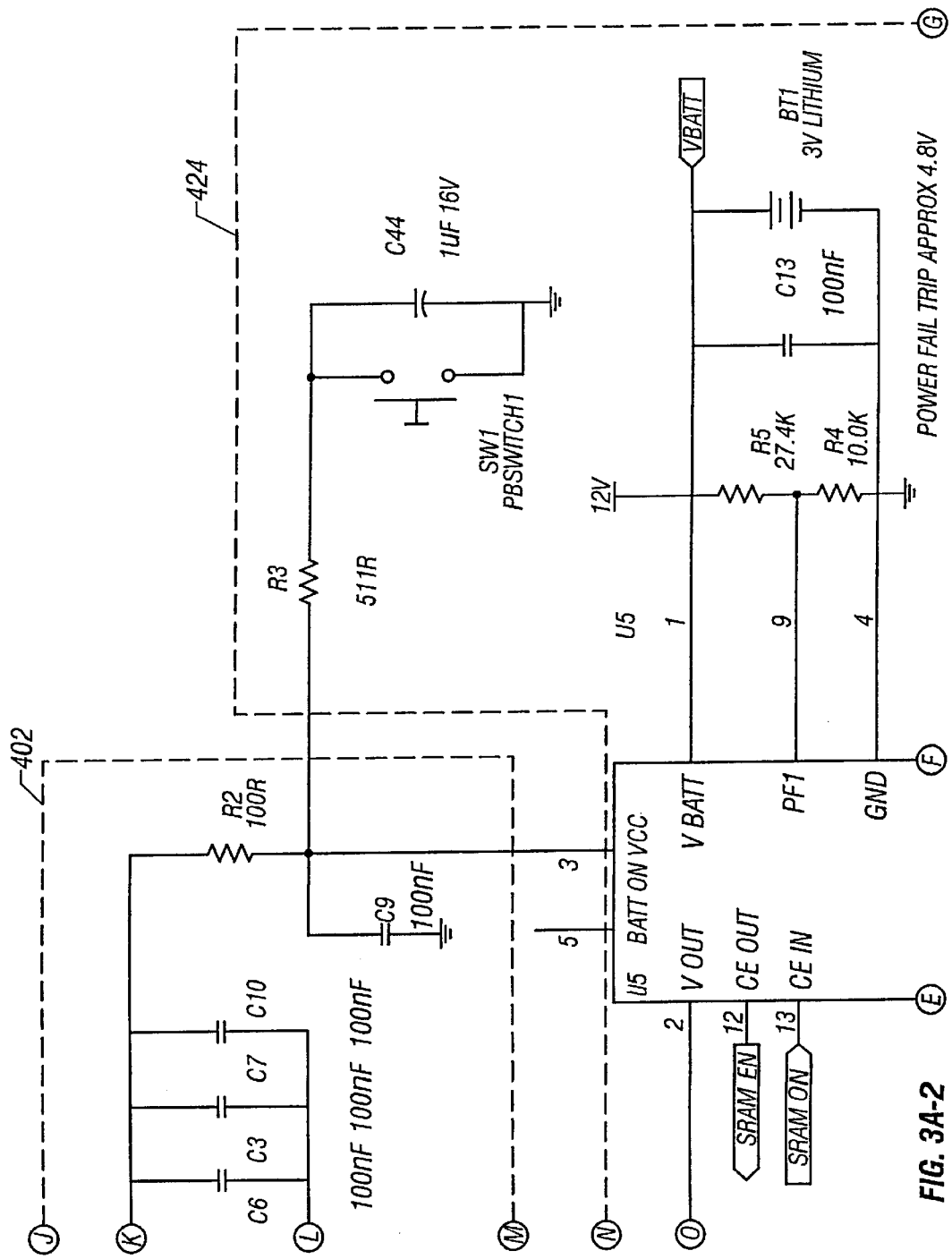
Figures 3, 3A:
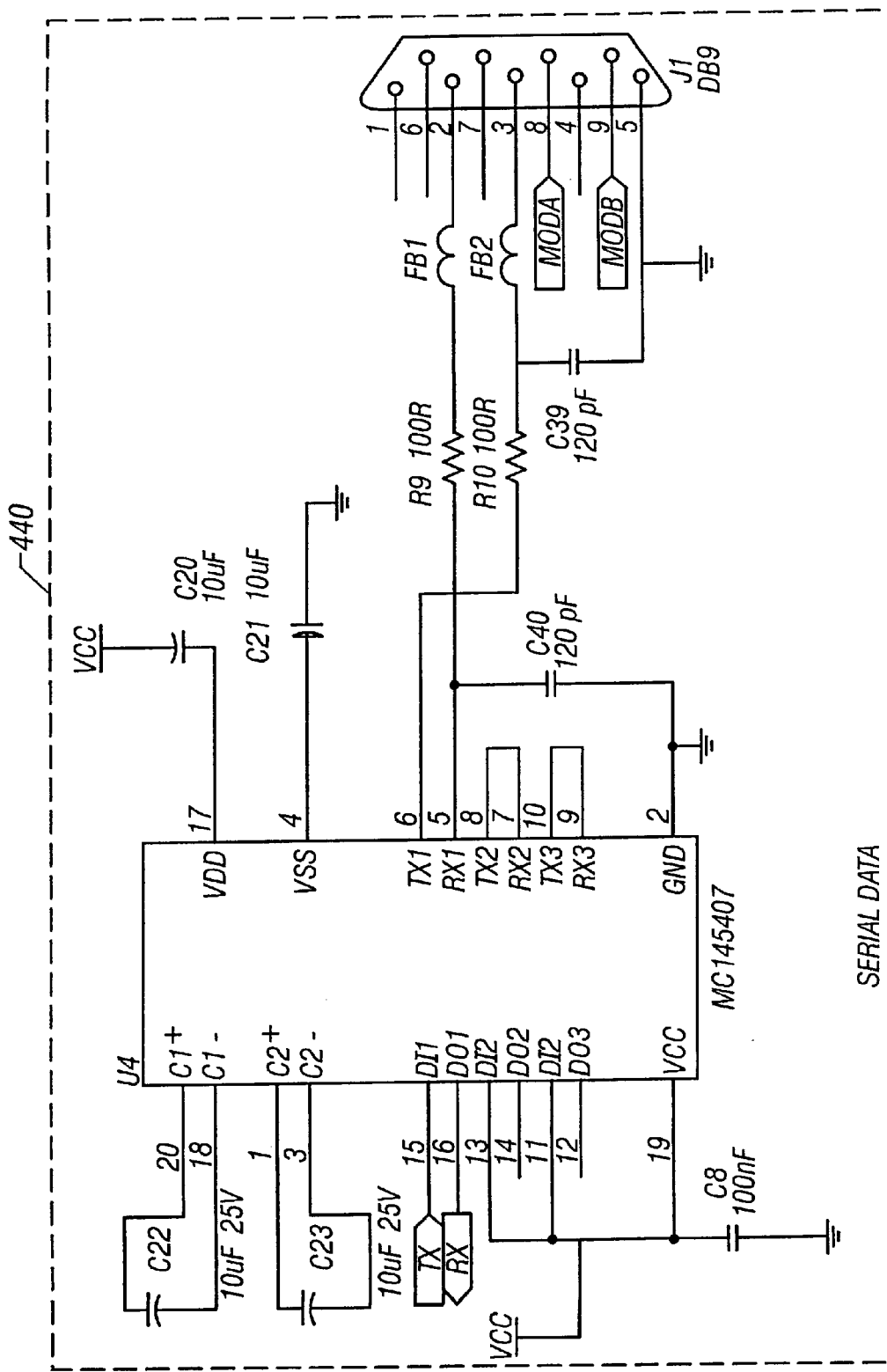
Figures 3, 3A, 4:
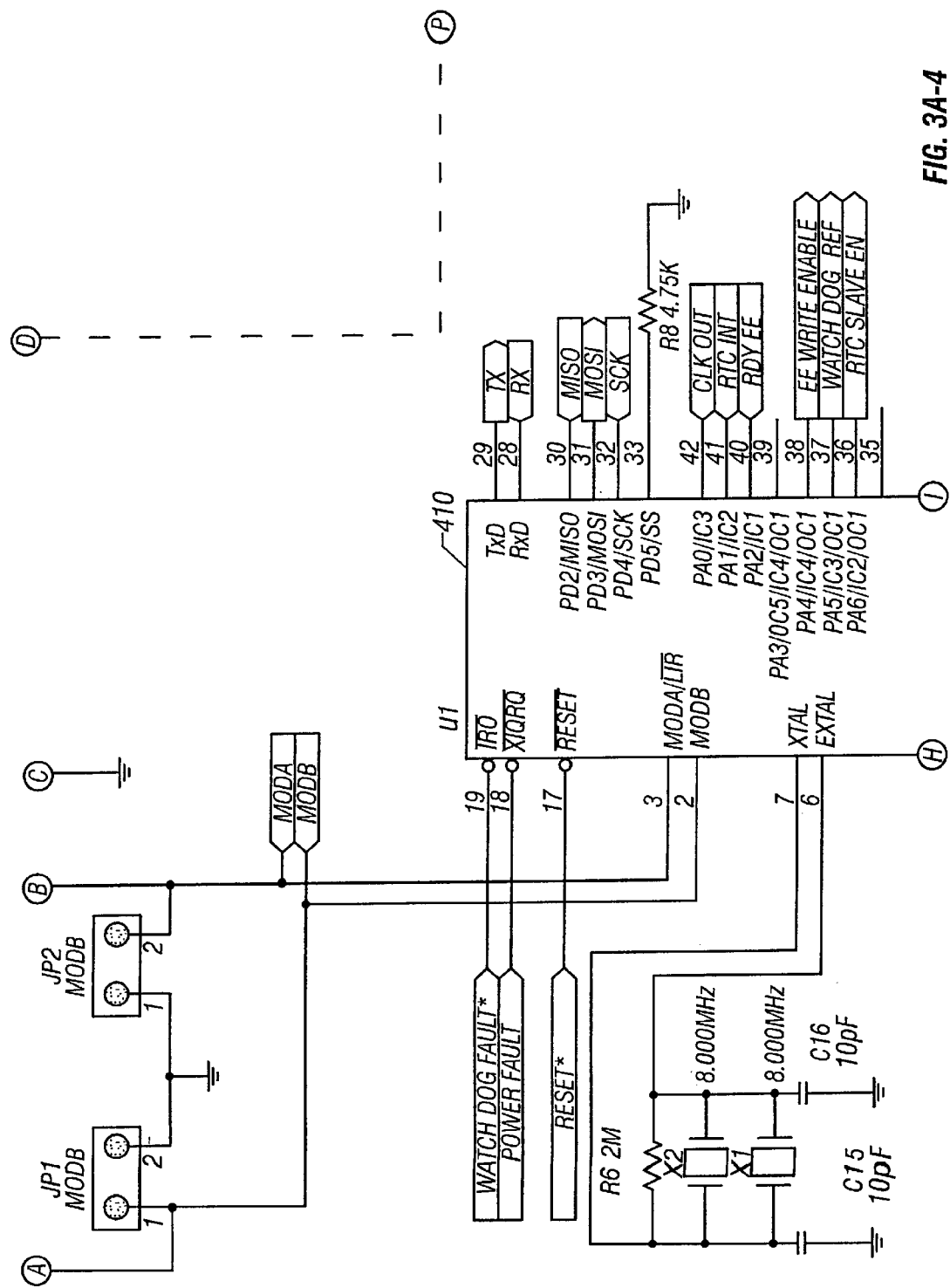
Figures 3, 3A, 4, 5:
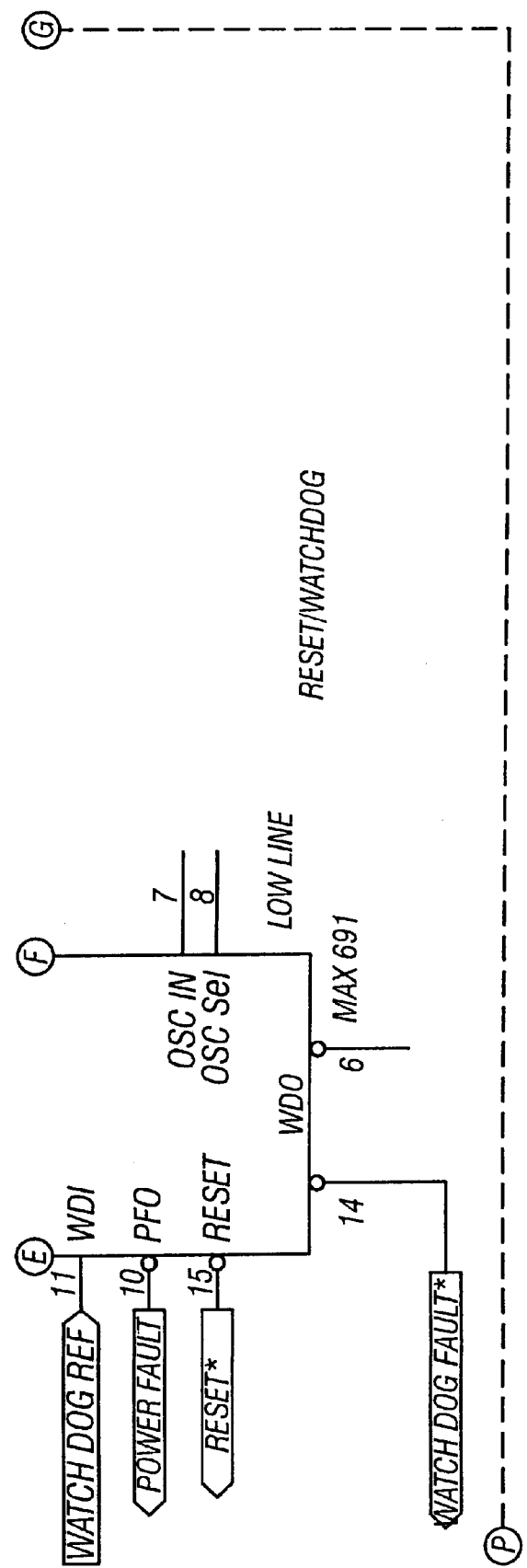
Figures 3, 3A, 4, 5, 6:
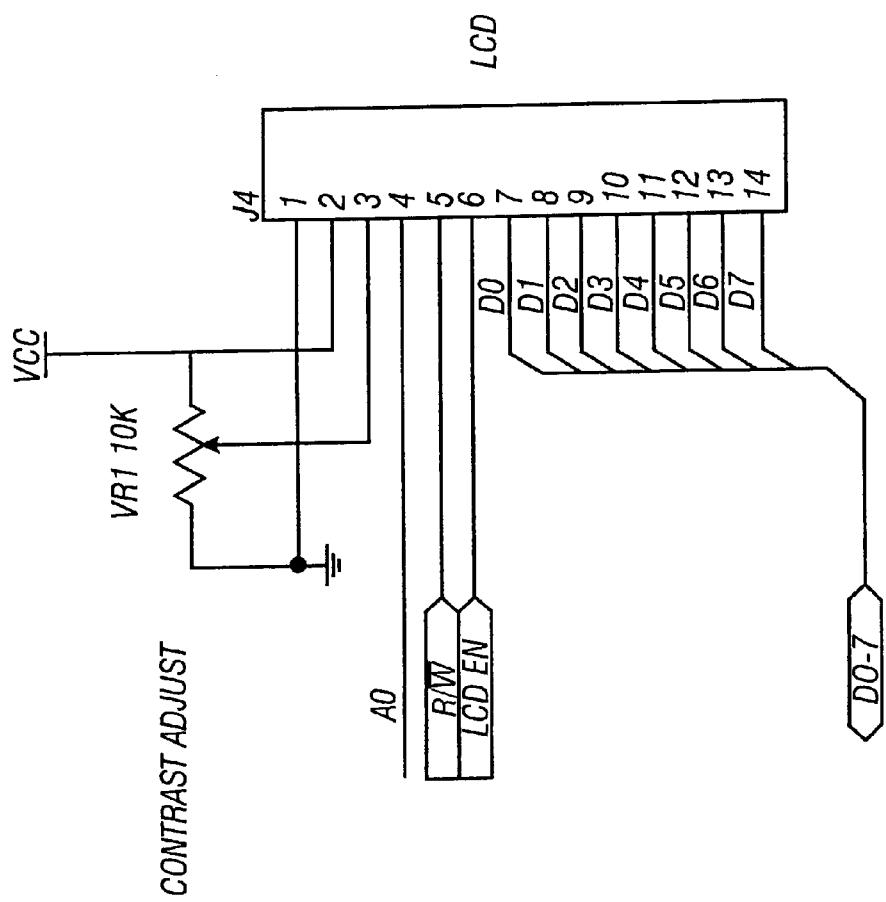
Figures 3, 3A, 4, 5, 6, 7:
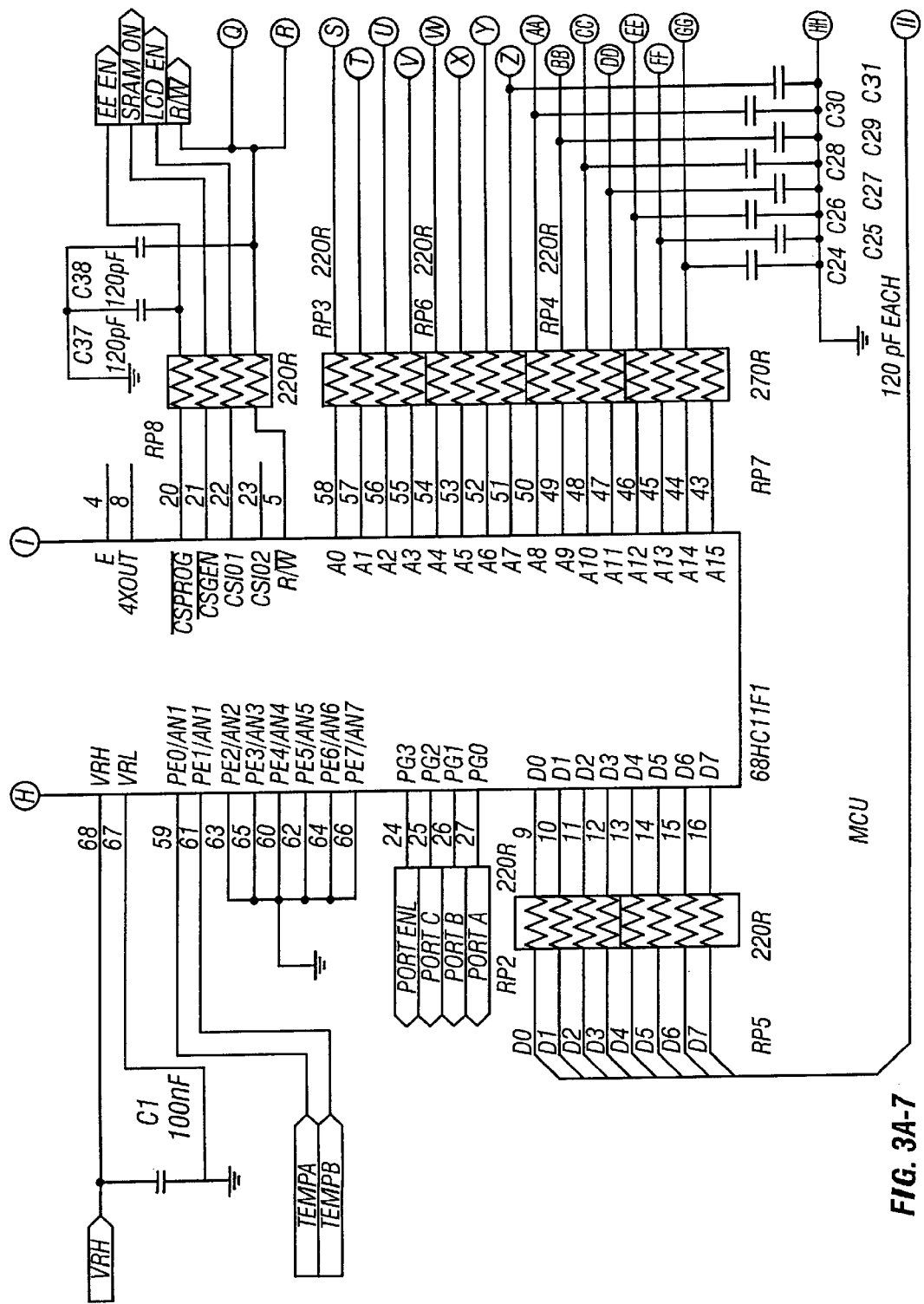
Figures 3, 3A, 4, 5, 6, 7, 8:
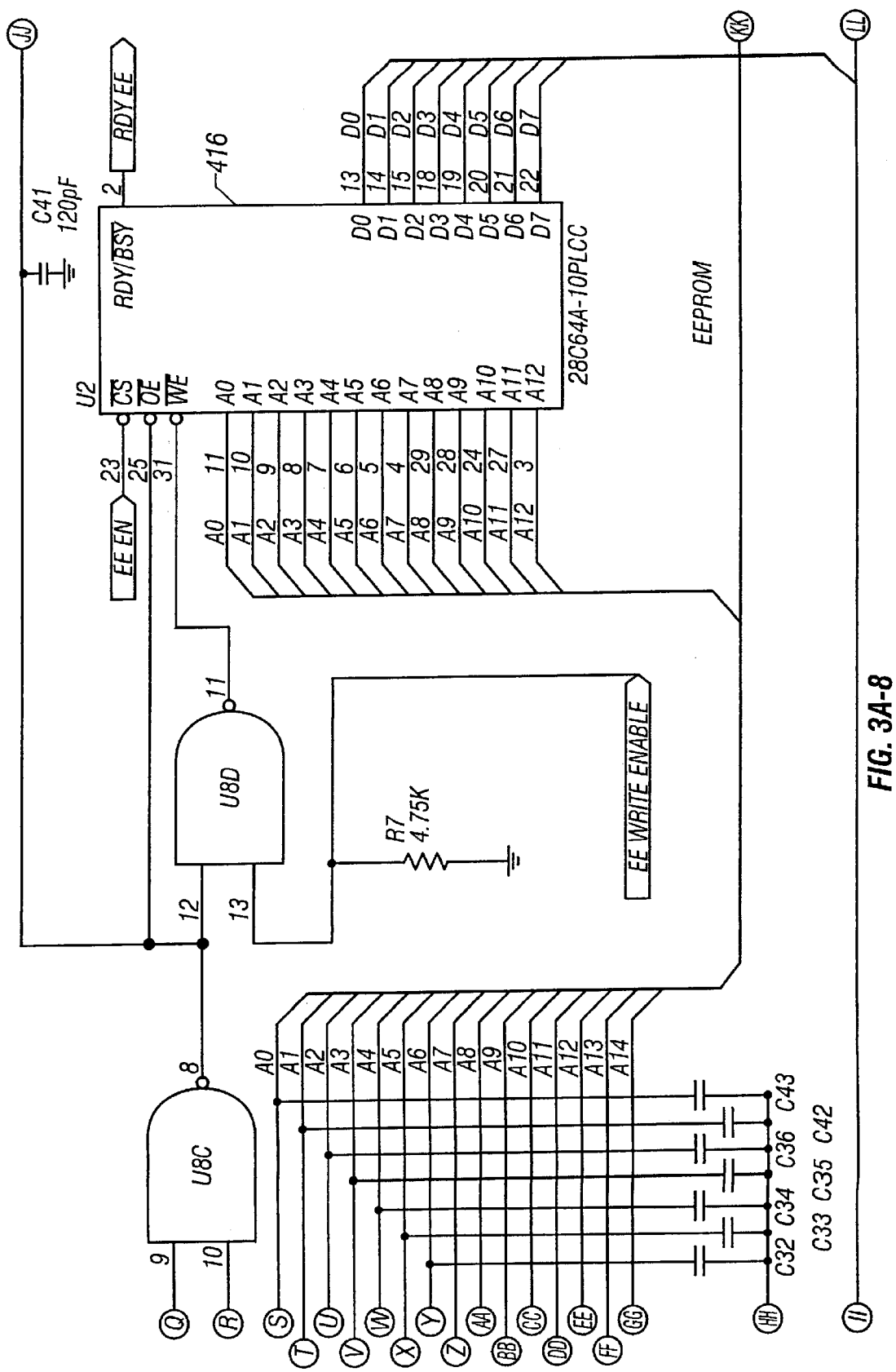
Figures 3, 3A, 4, 5, 6, 7, 8, 9:
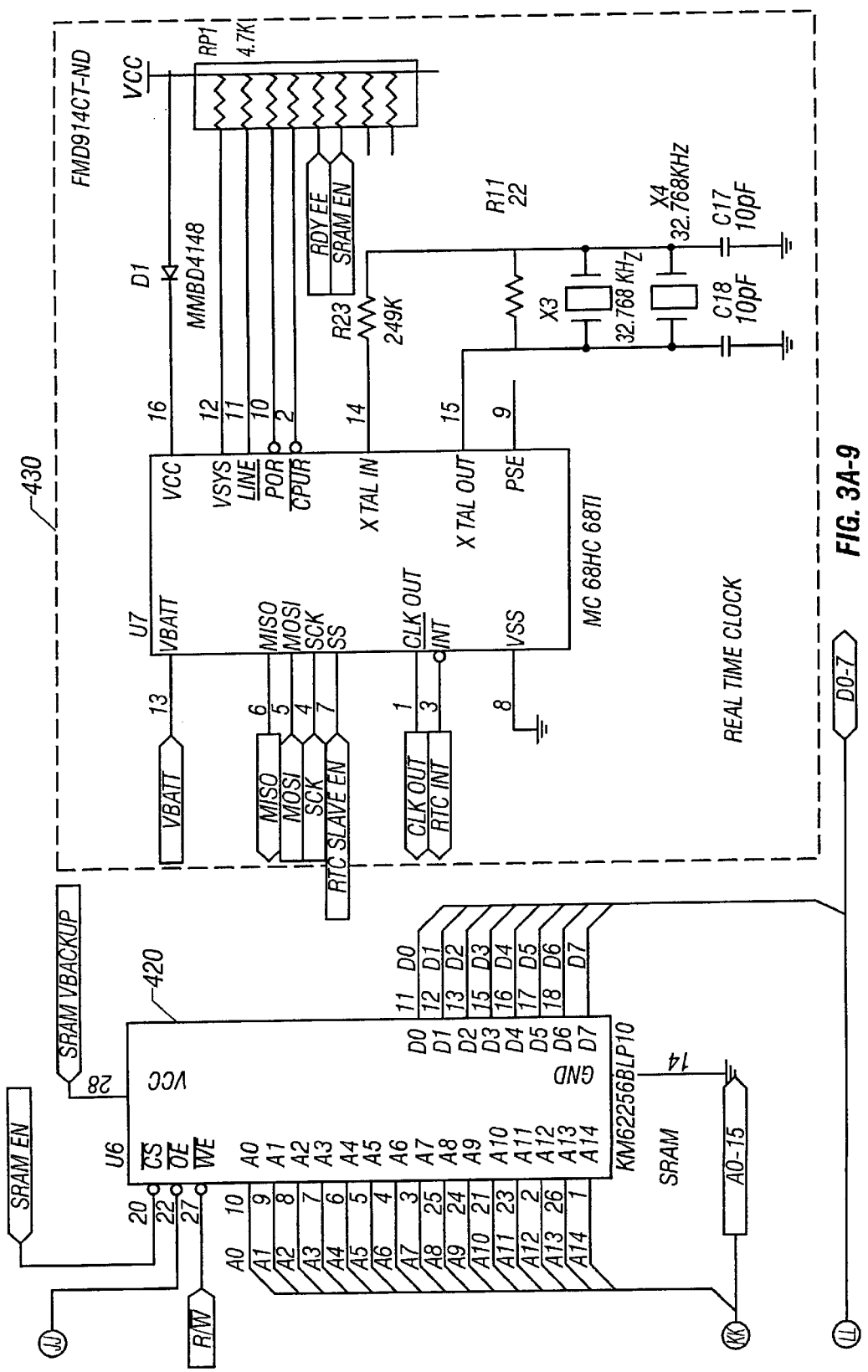
Figures 1, 3B:
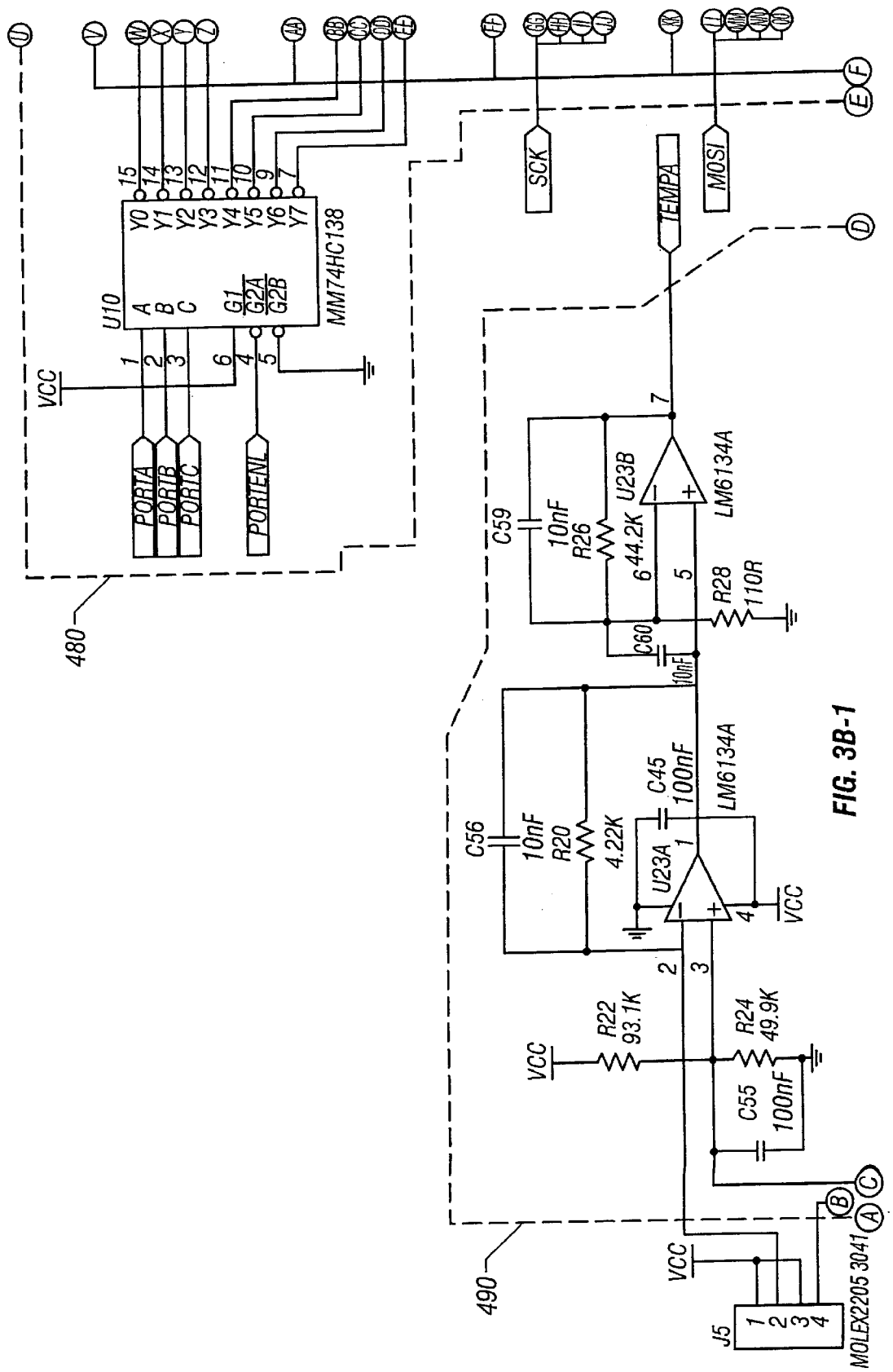
Figures 2, 3B:
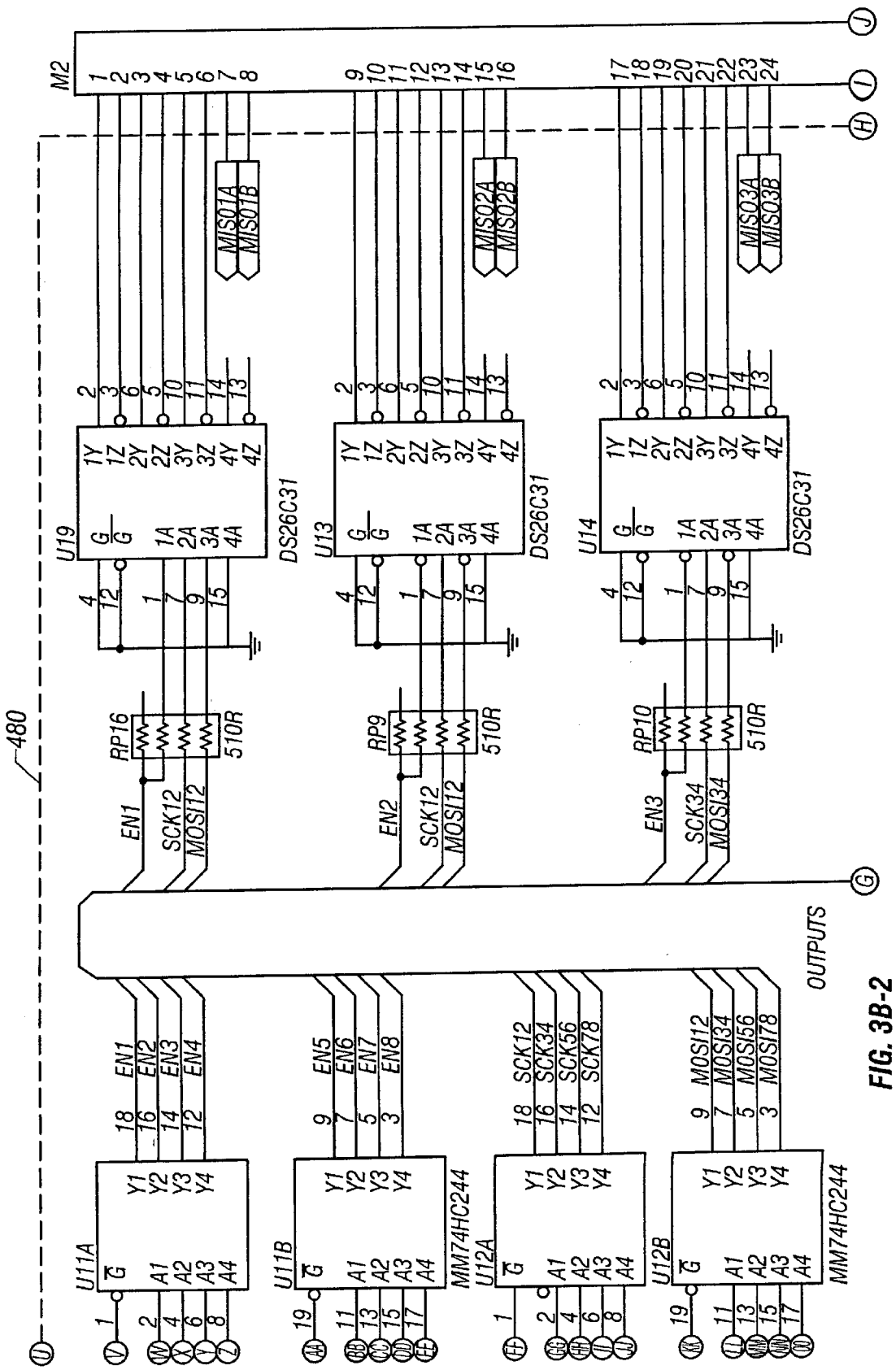
Figures 3, 3B:
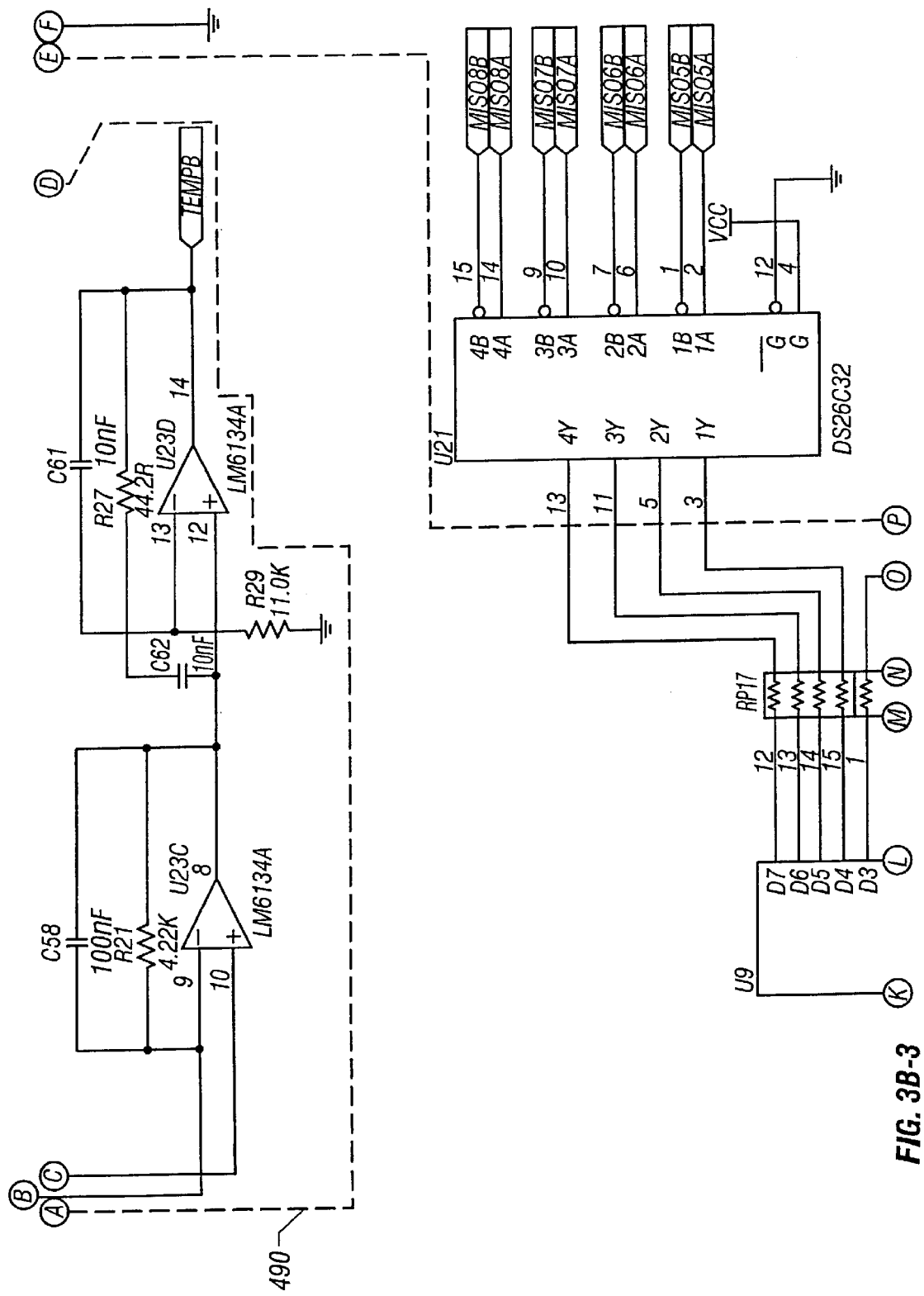
Figures 3, 3B, 4:
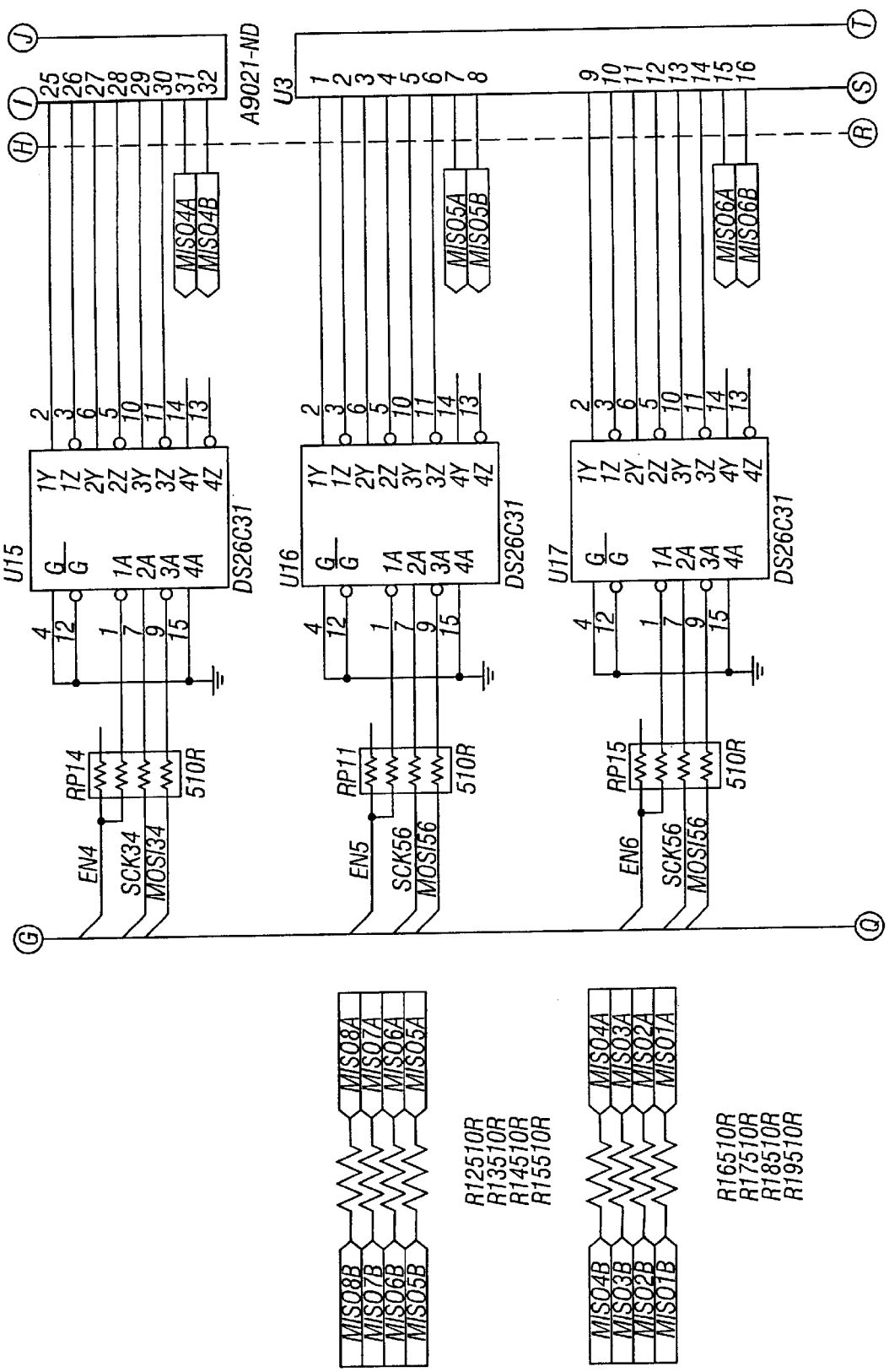
Figures 3, 3B, 4, 5:
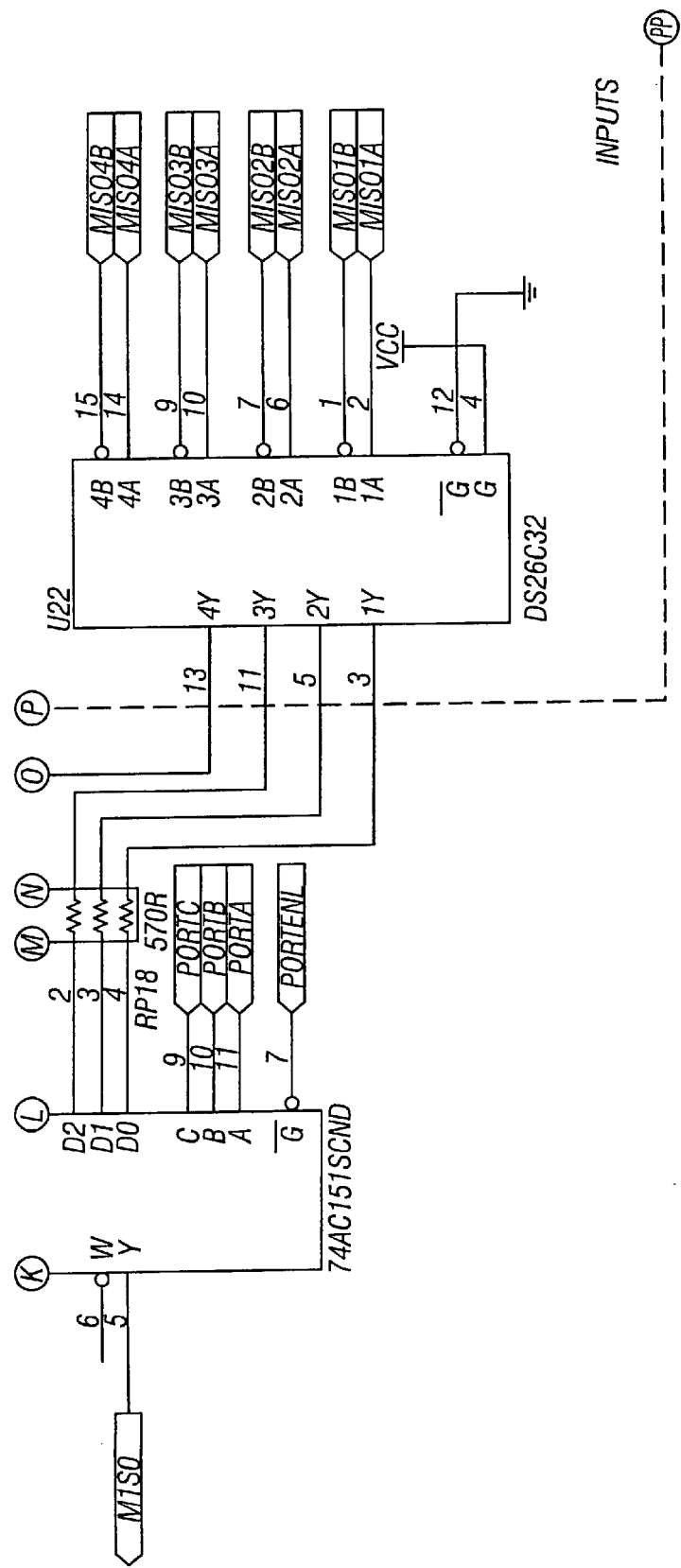
Figures 3, 3B, 4, 5, 6:
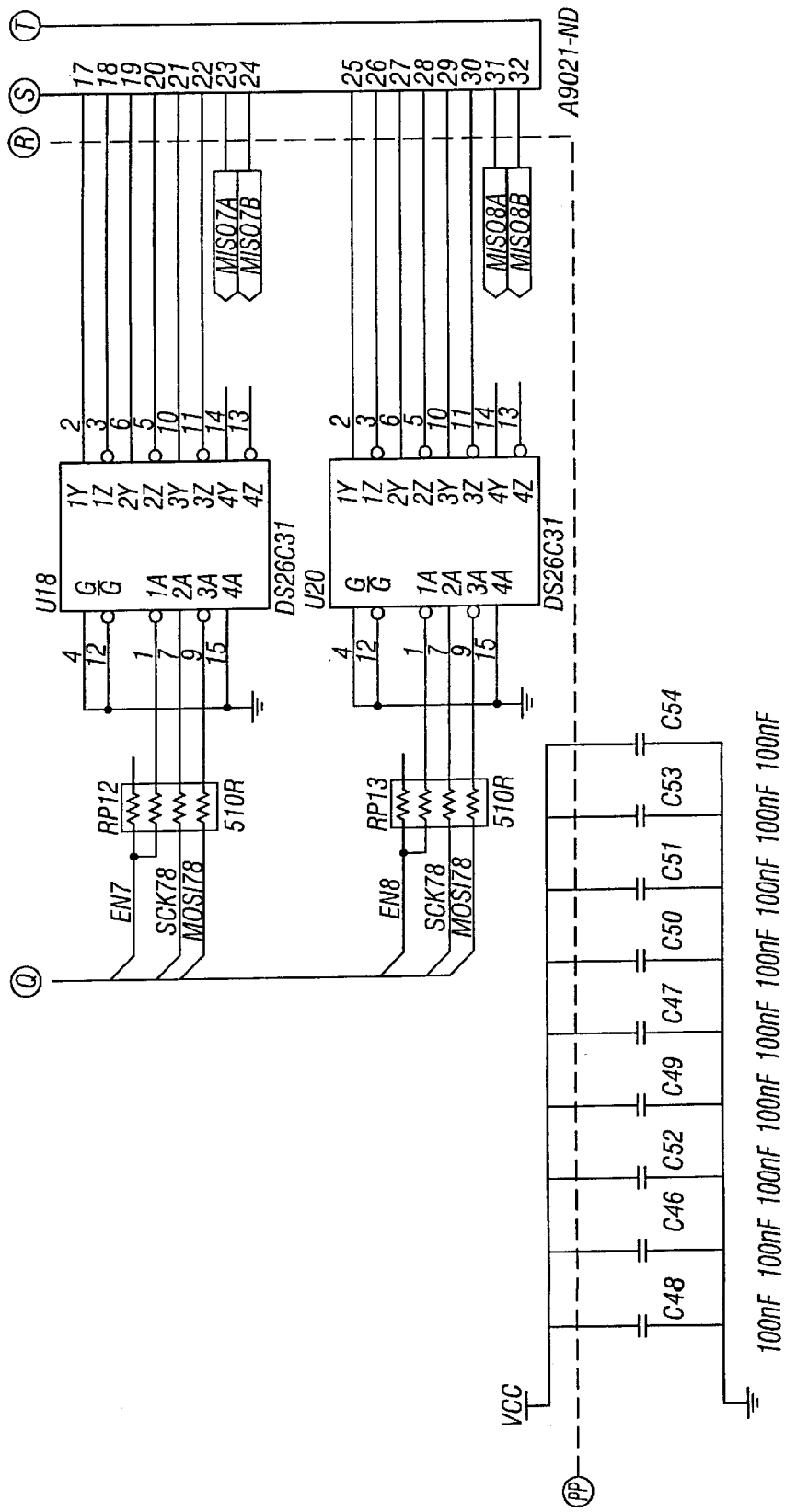

Referring now to FIG. 3A, which is comprised of nine subfigures entitled FIGS. 3A-1 through 3A-9, and FIG. 3B, which is comprised of six subfigures entitled FIGS. 3B-1 through 3B-6, the controller module 400 generally includes a 24 VDC input circuit 402 (FIG. 3A-1), a microprocessor 410 (FIG. 3A-4), electrically erasable programmable read only memory (EEPROM) 416 (FIG. 3A-8), memory 420 (FIG. 3A-9), reset circuit 424 (FIG. 3A-2), real time clock 430 (FIG. 3A-9), serial interface port 440 (FIG. 3A-3), RS422 line driver circuit 480 (FIG. 3B-1), and temperature sense circuit 490 (FIG. 3B-3). The circuit shown in FIGS. 3A and 3B represents an exemplary embodiment of one of a multitude of different controller circuits that could be used. A microprocessor is preferred, but the controller module 400 can be implemented without it. The controller module 400 shown preferably communicates with each of the charger modules 200. The communication interface to each charger module 200 is shown best in FIG. 3B by way of RS422 line driver circuit 480. Generally, circuit 480 permits two-way communication with the charger modules 200 as will be described in detail below. The charger modules can transmit any desired charging status parameters, such as battery voltage and current, temperature, and error conditions, to the controller module 400. The controller module 400, via the RS422 line driver module 480, transmits charge control parameters to the charger modules 200.

If desired, each charger module 200 can provide battery voltage and current values to the controller module 400. These values are provided to the microprocessor 410 which can calculate and keep track of how much energy has been delivered to each battery. The microprocessor 410 preferably determines when a predetermined amount of energy has been delivered to the battery. That predetermined amount of energy may be representative of a level that corresponds to a fully charged battery. Thus, the controller module determines the end of charge condition based on energy provided to the battery.

It may also be desirable for the controller module 400 to keep track of the relative condition, age or health of a battery being charged. The battery condition, age and health can be estimated by analyzing the charging process of a battery being charged. The relative health and condition of a battery can be quantified and preferably stored in memory 420 and the controller module 400 can alert an operator that a battery needs to be replaced when its health and condition drop below a predetermined level. The alert can be provided through the serial interface 440, described below. Alternatively, or additionally, the controller module 400 can disable charging to a particular battery once the battery's condition falls below the predetermined level by asserting the inhibit signal to the charger module 200 associated with that battery.

Referring to FIG. 3A, the microprocessor 410 preferably is a 68HC111F1 processor manufactured by Motorola, but alternatively may include any other suitable type of processor or microcontroller. The EEPROM device 416 preferably is 28C64A-10PLCC or other suitable memory device. The memory device 420 preferably is a static random access memory (RAM) device such as a KM62256BLP-10 or other suitable device. The EEPROM 416 preferably stores code to be executed by processor 410. The static RAM device 420 preferably is used as temporary storage for configuration parameters and other types of data. The processor 410 can write data to and read data from static RAM 420.

The reset circuit 424 generally comprises a reset device U5 and associated resistors R4 and R5, capacitors C12 and C13 and lithium battery BT1. The battery BT1 permits the controller module 400 to retain settings in static RAM even if power is lost from the power supply module 110. The reset device U5 preferably is a MAX691 or other suitable device and generally maintains the processor 410 in a reset or inhibited state, by holding the RESET* signal low, until the power supply voltage to the processor has stabilized following an initial power up condition. Once the 24 VDC voltage prom power supply module 110 has stabilized, U5 releases RESET* (RESET* goes high) and the processor 410 completes its initialization process.

The real time clock circuit 430 preferably includes a MC68HC68T1 clock device and associated resistor R11, capacitors C17 and C18, diode D1, and crystal oscillators X3 and X4. The real time clock circuit 430 provides time of day and date data to the processor 410. The RTC INT signal is provided as an interrupt input signal to the processor 410 and is used to provide a wake up alarm signal that will notify the processor to update or execute time of day or date driven event tasks.

The charge controller module 400 also includes a serial interface 440 that preferably includes a MC145407 level converter U4 coupled to capacitors C8, C20, C21, C22, C23, C40, resistors R9 and R10 and fuses FB1 and FB2 as shown in FIG. 3A. A computer or terminal can be connected to the serial interface 440 and used to download programming code and configuration data for controlling the charging protocol of a single battery or a set of batteries. Further, battery charge status information can be uploaded through the serial interface 440 if desired. Additionally, the serial interface 440 can include conventional circuitry to permit a wireless communication link with a remote terminal. For example, the serial interface 440 can include satellite transmission circuitry to permit a communications link with remote terminal via a satellite.

The communication between a terminal connected to the serial interface 440 and the charger controller 400 can include any suitable type of communication scheme. In accordance with the preferred embodiment, however, the communication scheme includes transmitting ASCII characters which encode various commands from the terminal to the serial interface 440 which then are interpreted and executed by the processor 410. The ASCII character command set preferably includes the commands and the associated descriptions shown in Table II below.

TABLE II

Command Set.

| Command | Short Command | Description |
| --- | --- | --- |
| AMP | A | Display energy in amp-hours stored into battery on this port up to this point in time. |
| CHARGE | G | Start/restart charging progress on this port. |
| HELP | H | Display the commands |
| LOG | L | Displays current, voltage, amp-hours, & temp continuously using *CSV on port 0 |
| PORT | P | Displays current, voltage, amp-hours, & temp of port. |
| STOP | S | Stops charging process for port. |
| TEMP | T | Shows battery temperature in ° C. of port. |
| VOLT | V | Shows battery voltage of port. |

Referring now to FIG. 3B, RS422 line driver circuit 480 preferably includes a 1-of-8 decoder/demultiplexer U10 (MM74HC138), four buffers U11A, U11B, U12A, U12B (MM74HC244), eight RS422 transmitters U13–U20 (DS26C31), two RS422 receivers U21 and U22 (DS26C32) and eight-to-one multiplexer U9 (74C151SC ND). Data flowing from the controller module 400 to the charge modules 200 is generated or otherwise provided by the processor 410 as the Master Out Slave In (MOSI) serial output signal (pin 31 of the processor 410). The MOSI output data may include status signals, configuration data or any other desired information. The MOSI output signal is provided via buffer U12B to the various RS422 transmitters U13–U20 as shown in FIG. 3B. A system clock (SCK) is also provided through buffer U12A to the various RS422 transmitters. The charger controller 400 preferably communicates with one charge module 200 at a time. To initiate communications with a particular charge modules 200, the processor 410 generates a three-bit binary value on pins 25–27 which are labeled PORTC:PORTA. A three-bit value can encode as many as eight different values and each value encoded by PORTC:PORTA corresponds to a particular charger module 200. Thus, for example, if the processor 410 is to communicate with the second charger module 200, the processor 410 generates a value of '010' (binary 2) for PORTC:PORTA. The processor 410 also generates a port enable signal PORTEN which enables communication in to and out of the charge controller 400. The battery charger system 100 shown in FIG. 1 includes six charger modules 200. Controller module 400 can communicate with as many as eight charger modules and even more with modifications easily made by one of ordinary skill in the art.

Referring still to FIG. 3B, the PORTC:PORTA value is provided to the input signals marked A, B, and C of the 1-of-8 decoder/demultiplexer U10. In response, U10 asserts one of its eight output enable lines (Y0:Y7) corresponding to the particular PORTC:PORTA value provided on the input lines. Thus, for a PORTC:PORTA value of binary 2, U10 asserts the second output enable line (Y2) high. Each enable line from U10 is provided through one of the buffers U11A, U11B to an RS422 transmitter U13–U20. Each charger module 200 only responds to signals from the charge controller 400 when the enable line associated with that particular charger module 200 is asserted; otherwise, the charger module 200 ignores signals from the controller module 400.

As described, each charger module 200 receives a system clock signal, an enable signal and a data signal from the charge controller 400. The system clock signal is used in accordance with conventional RS422 protocol to synchronize transmission of information between transmitters and receivers. Each charger module 200 provides data to the charge controller 400 and is received by the RS422 receivers U21, U22. The data from the receivers U21, U22 then is multiplexed by multiplexer U9 under control by the PORTC:PORTA and PORTEN signals.

The temperature sense circuit 490 preferably includes a processing circuit to process temperature signals from one or two temperature sensors (not shown) coupled to connector J5. The temperature sensors may be thermocouples or other suitable temperature sensitive devices and can be located anywhere such as fixedly attached to the enclosure (not shown) that houses the charger's electronics. Each circuit preferably includes an operational amplifier (LM6134A) particularly suited for processing temperatures signals. The output signals from the temperature sense circuits is labeled as TEMPA and TEMPB and preferably are provided directly to pins 59 and 61 of processor 410. The processor 410 can be programmed to take appropriate action in the event the temperature becomes too high or too low. The action could be any suitable action such as stopping the charging of the batteries.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A battery charger, comprising:
   a source of electrical current adapted to be coupled to a rechargeable battery for charging the battery; and
   a leakage current sense circuit adapted to be coupled to the rechargeable battery wherein said leakage current sense circuit detects leakage current associated with the rechargeable battery.

2. The battery charger of claim 1 wherein said leakage current sense circuit includes a current-to-voltage converter coupled to the battery and a buffer coupled to the current-to-voltage converter.

3. The battery charger of claim 1 further including a charge controller module coupled to said sense circuit which generates a leakage signal in response to detecting leakage current and said leakage signal is provided to said charger controller module.

4. The battery charger of claim 3 wherein said charge controller module turns off said source of electrical current to the rechargeable battery when said sense circuit asserts said leakage signal.

5. A battery charger, comprising:
   a source of charging current for charging a rechargeable battery;
   charging control logic for controlling the amount of charging current provided to the battery;
   a cable for coupling said current source and said charging control logic to the battery; and
   wherein said charging control logic compensates for voltage drop along said cable without the use of a sense line between the battery and the control logic.

6. The battery charger of claim 5 further including a resistor coupled between a battery monitor input of said charging control logic and ground thereby subtracting a proportional voltage representative of voltage drop along said cable from a voltage representative of battery voltage.

7. The battery charger of claim 5 wherein further including a controller module coupled to said charging control logic and a current monitor and a voltage monitor coupled to the battery for providing current and voltage values to said controller module which uses said current and voltage values to calculate the amount of energy provided to the battery.

8. The battery charger of claim 7 wherein said controller module asserts an inhibit signal to said charging control logic when a predetermined amount of energy has been provided to the battery.

9. A battery charger for connecting to a rechargeable battery through a battery cable, comprising:
   means for generating charging current for the rechargeable battery;
   means for controlling the level of charging current; and
   means for compensating for battery cable voltage drop without using a sense line.

* * * * *